US009858292B1

(12) United States Patent
Setlur et al.

(10) Patent No.: US 9,858,292 B1
(45) Date of Patent: Jan. 2, 2018

(54) SYSTEMS AND METHODS FOR SEMANTIC ICON ENCODING IN DATA VISUALIZATIONS

(71) Applicant: Tableau Software, Inc., Seattle, WA (US)

(72) Inventors: Vidya Raghavan Setlur, Portola Valley, CA (US); Jock Douglas Mackinlay, Bellevue, WA (US)

(73) Assignee: Tableau Software, Inc., Seattle, WA (US)

( * ) Notice: Subject to any disclaimer, the term of this patent is extended or adjusted under 35 U.S.C. 154(b) by 189 days.

(21) Appl. No.: 14/076,927

(22) Filed: Nov. 11, 2013

(51) Int. Cl.
*G06F 17/30* (2006.01)

(52) U.S. Cl.
CPC .. *G06F 17/30244* (2013.01); *G06F 17/30554* (2013.01)

(58) Field of Classification Search
CPC ............... G06F 17/30991; G06F 17/30244
See application file for complete search history.

(56) References Cited

U.S. PATENT DOCUMENTS

| 5,880,742 | A * | 3/1999 | Rao ........................ G06F 3/023 345/440 |
| 2012/0296897 | A1* | 11/2012 | Xin-Jing ........... G06F 17/30265 707/728 |
| 2013/0124958 | A1* | 5/2013 | Mendelovich ........ G06F 17/245 715/212 |

OTHER PUBLICATIONS

Robichaud, "A Graph Visualization Tool for Terminology Discovery and Assessment", Sep. 9, 2011.*
Gong et al.,"Web Query Expansion by Word Net", 2005.*
Rajagopal et al., "Commonsense-Based Topic Modeling", Aug. 2013.*
Bjork, WEST: A Web Browser for Small Terminals, CHI Letters vol. 1,1, 1999, 10 pgs.
Blattner, Earcons and Icons: Their Structure and Common Design Principles, Human-Computer Interaction, 1989, vol. 4, 34 pgs.
Cleveland, Graphical Perception: Theory, Experimentation and Application to the Development of Graphical Methods, Journal of the American Statistical Assoc., Sep. 1984, vol. 79, No. 387, Applications Section, 24 pgs.
Coren, Principles of Perceptual Organization and Spatial Distortion: The Gestalt Illusions, Journal of Experimental Psychology: Human Perception and Performance 1980, vol. 6, No. 3, 9 pgs.

(Continued)

*Primary Examiner* — Neveen Abel Jalil
*Assistant Examiner* — Dawaune Conyers
(74) *Attorney, Agent, or Firm* — Morgan, Lewis & Bockius LLP

(57) ABSTRACT

A method of semantic icon encoding for a data visualization includes identifying a set of field values for a field in a data structure. The field has an associated field name and each field value corresponds to a record in the data structure. The field values are words in a natural language. The method queries a database of images using a plurality of queries. Each respective query comprises a respective set of base terms that include a respective field value and the field name. The method receives images from the database for each of the queries and selects an image from the received images for each of the field values. The method displays data from the data structure in a data visualization. Each respective record is displayed using the corresponding respective selected image, which is displayed at a location in the data visualization according to data in the respective record.

20 Claims, 23 Drawing Sheets

(56) References Cited

OTHER PUBLICATIONS

Familant, Iconic Reference: Evolving Perspectives and an Organizing Framework, Int. J. Man-Machine Studies, 1993, 24 pgs.
Gittins, Icon-Based Human-Computer Interaction, Int. J. Man-Machine Studies, 1986, 25 pgs.
Healey, Visualizing Real-Time Multivariate Data Using Preattentive Processing, The Univ. of British Columbia, 1995, 35 pgs.
Henry, Multidimensional Icons, The Interaction Technique Notebook, University of Arizona, ACM Transactions on Graphics, vol. 9, No. 1, Jan. 1990, 5 pgs.
Kosslyn, Graphics and Human Information Processing: A Review of Five Books, Journal of the American Statistical Assoc., vol. 80, Issue 391, 1985, 15 pgs.
Lewis, VisualID's: Automatic Distinctive Icons for Desktop Interfaces, 2004, 8 pgs.
Li, An Approach for Measuring Semantic Similarity between Words Using Multiple Information Sources, IEEE Transactions on Knowledge and Data Engineering, vol. 15, No. 4, Jul./Aug. 2003, 12 pgs.
MacKinlay, Automating the Design of Graphical Presentations of Relational Information, AMC Transactions on Graphics, vol. 5, No. 2, Apr. 1986, 32 pgs.
Marcus, Icons, Symbols, and Signs: Visible Languages to Facilitate Communication, fast forward, interactions, May/Jun. 2003, 7 pgs.
Nowell, Graphical Encoding for Information Visualization: Using Icon Color, Shape, and Size to Convey Nominal and Quantitative Data, Nov. 7, 1997, 84 pgs.
Resnik, Using Information Content to Evaluate Semantic Similarity in a Taxonomy, Sun Microsystems Laboratories, Nov. 29, 1995, 6 pgs.
Rogers, Icons at the Interface: Their Usefulness, vol. 1, Issue 1, Apr. 1989, 13 pgs.
Rother, "GrabCut" Interactive Foreground Extraction Using Iterated Graph Cuts, 2004, 6 pgs.
Setlur, Semanticons: Visual Metaphors as File Icons, The Eurographics Association, 2005, 10 pgs.
Shneiderman, Designing the User Interface, Chapters 1 & 2, 1987, 79 pgs.
Smith, Color Versus Shape Coding in Information Displays, Journal of Applied Psychology, vol. 48, No. 3, Jun. 1964, 10 pgs.
Wobbrock, WebThumb: Interaction Techniques for Small-Screen Browsers, Human Computer Interactions Inst. and School of Design, Oct. 27-30, 2002, 4 pgs.
Woodruff, Using Thumbnails to Search the Web, Mar. 31-Apr. 4, 2001, 8 pgs.
Wordnet, An Electronic Lexical Database, edited by Christiane Fellbaum, Chapters 1-4, 6-7,9,11-12, 1998, 207 pgs.
Wu, Verb Semantics and Lexical Selection, ACL '94 Proceedings of the 32nd Annual Meeting on Assoc. for Computational Linguistics, 1994, 6 pgs.

\* cited by examiner

Spreadsheet 200

Figure 2A

| | A | B | C | D |
|---|---|---|---|---|
| 1 | Animal | Brain Mass (g) | Body Mass (kg) | |
| 2 | Tyrannaosaurus Rex | 105 | 10,000 | |
| 3 | Male Gorilla | 500 | 210 | |
| 4 | Chimpanzee | 400 | 75 | |
| 5 | Hummingbird | 0.15 | 0.004 | |

Animal Data

214 → 1
216 → 2
218 → 3
220 → 4
222 → 5

202, 204, 206, 208, 210, 212, 224, 226, 228, 230, 232, 234, 236

Animal Data Table 250

Figure 2B

| Animal_Id | Animal_Name | Brain_Mass | Body_Mass |
|---|---|---|---|
| 41372005 | Tyrannaosaurus Rex | 105 | 10,000 |
| 32118261 | Male Gorilla | 500 | 210 |
| 35088173 | Chimpanzee | 400 | 75 |
| 96210738 | Hummingbird | 0.15 | 0.004 |

260 → 262 → 264 → 266 →

252, 254, 256, 258, 268, 270, 272, 274, 276, 278

Animal XML File 298

```
<?xml version='1.0' encoding='utf-8' ?>
<workbook>
```
280 → `<encoding attr='shape' field='[Animal]'>`

282
```
<animal>
    <animal_name>Tyrannosaurus Rex</animal_name>
    <brain_mass>105</brain_mass>
    <body_mass>10000</body_mass>
</animal>
```

284
```
<animal>
    <animal_name>Hummingbird</animal_name>
    <brain_mass>0.15</brain_mass>
    <body_mass>0.004</body_mass>
</animal>
```

286
```
<animal>
    <animal_name>Male Gorilla</animal_name>
    <brain_mass>500</brain_mass>
    <body_mass>210</body_mass>
</animal>
```

288
```
<animal>
    <animal_name>Chimpanzee</animal_name>
    <brain_mass>400</brain_mass>
    <body_mass>75</body_mass>
</animal>
```

...
`</encoding>`

...

290 → `<worksheet name='Animal Data'>`

...
`</worksheet>`

...
`</workbook>`

Figure 2C

Synonym sets (synsets) for "car" 400

- 402 → {02961779} S: (n) car, auto, automobile, machine, motorcar (a motor vehicle with four wheels; usually propelled by an internal combustion engine) *"he needs a car to get to work"*
- 404 → {02963378} S: (n) car, railcar, railway car, railroad car (a wheeled vehicle adapted to the rails of railroad) *"three cars had jumped the rails"*
- 406 → {02963937} S: (n) car, gondola (the compartment that is suspended from an airship and that carries personnel and the cargo and the power plant)
- 408 → {02963788} S: (n) car, elevator car (where passengers ride up and down) *"the car was on the top floor"*
- 410 → {02937835} S: (n) cable car, car (a conveyance for passengers or freight on a cable railway) *"they took a cable car to the top of the mountain"*

From WordNet 3.0 Copyright 2006 by Princeton University.

Figure 4A

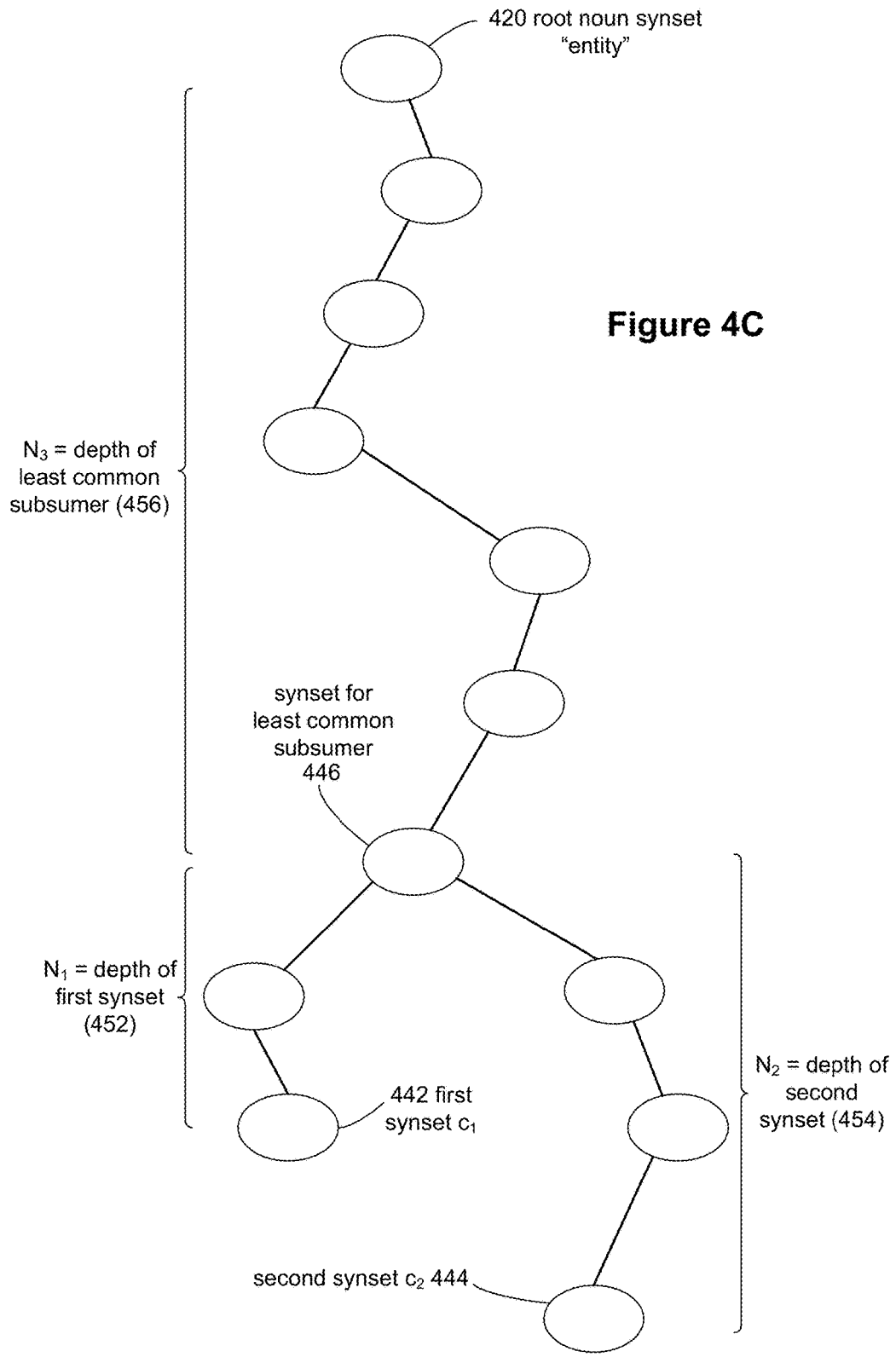

Relatedness of synsets (472)

$$R(c_1, c_2) = \frac{2N_3}{N_1 + N_2 + 2N_3}$$

Figure 4D

Relatedness of terms (words) (474)

$$f(t_1, t_2) = \max_{\substack{c_i \in S(t_1) \\ d_j \in S(t_2)}} R(c_i, d_j)$$

Figure 4E

| Input Term | Top co-occurring words | Relatedness to "symbol" |
|---|---|---|
| country | flag | 0.9231 |
| | government | 0.5170 |
| | constitution | 0.1176 |
| company | logo | 0.9844 |
| | office | 0.4153 |
| | employees | 0.1230 |
| stock | ticker | 0.9738 |
| | market | 0.3181 |

Figure 8

SYSTEMS AND METHODS FOR SEMANTIC ICON ENCODING IN DATA VISUALIZATIONS

TECHNICAL FIELD

The disclosed implementations relate generally to data visualizations and more specifically to the use of semantic icons in data visualizations.

BACKGROUND

Data visualizations are an effective way to communicate data. In some instances, the data can be communicated even more effectively by using graphic icons as visual marks rather than simple dots, lines, or bars. For example, a graph showing information about college football teams might use a dot for each team with a label next to the dot to indicate the team name. Using semantic icon encoding, the dots and labels could be replaced by icons that represent each team. One difficulty is finding icons for each of the data points. Visualization tools typically provide no shape library or limited libraries that are not sufficient to handle larger cardinalities of data. The user is then forced to manually create or search for icons. Such a process hinders the flow of visual analysis, leading to a non-optimal user experience.

SUMMARY

Disclosed implementations address the above deficiencies and other problems associated with the manual processes of finding and/or creating useful images for semantic encoding. Disclosed implementations automatically identify semantically relevant shape encodings for a given data visualization. The algorithms find relevant images on the user's computer, on local networks, and/or on the Internet, and evaluate the images with respect to the terms (the "categorical terms") that they will represent. This is particularly useful when there are many terms to encode.

Shape encodings are graphical elements that are often used as a visual syntax to represent the semantic meaning of marks representing categorical data. These mappings of information to display elements help the user to perceive and interpret the visualization. The encodings can be effective in enabling visual analysis because they are often rapidly and efficiently processed by the pre-attentive visual system rather than attentive effort. The Gestalt principles reflect strategies of the human visual system to recognize and spatially categorize shapes in order to create a meaningful understanding of the visualization. FIGS. 1A and 1B illustrate this concept. FIG. 1B provides enough semantic information about the data, allowing the visual system to apply visual and spatial categorization in order to understand the display.

Shape encodings play an important role in the flow of visual analysis. For example, consider the situation where a user is looking at a scatterplot to observe how the number of bird strikes with aircraft is correlated with average miles from the airport and average feet from the ground. Here, the shape icons represent wildlife data. While looking at this view, the user would like to explore the same correlation with respect to state. It would be useful if the visualization tool provided a fast and seamless way to assign state icons to all of the states in the view. This would keep the user engaged in the flow of analysis, rather than manually trying to find the right shapes. Some visualization tools have shape libraries, but the libraries are rather small and do not contain semantically meaningful icons. For example, some tools include a shape palette of circles, squares, triangles, crosses, and similar elementary shapes. This would be inadequate for the examples presented here, both because they are not visually distinctive and because of the time it would take to find or build appropriate icons.

Disclosed implementations present an algorithm that reduces or eliminates the interruption in the visual flow of analysis. Using existing large shape libraries on the user's computer, on local networks, and/or on the Internet, implementations identify appropriate icons or images for the categorical data in a data visualization. Some implementations employ natural language processing (NLP) techniques, among others, taking into account the inherent design and functional characteristics of shape encodings to provide more meaningful images for the user.

In accordance with some implementations, a computer-implemented method executes at a client device with one or more processors and memory to identify appropriate images or icons for semantic encoding of categorical data for a data visualization. The method identifies a set of field values for a field in a data structure, where the field has an associated field name and each field value corresponds to a record in the data structure. The field values are words in a natural language. The method queries a database of images using a plurality of queries, where each query comprises a respective set of base terms that include a field value from the set of field values and the field name. The method receives images from the database of images in response to each of the queries and selects an image from the received images for each of the field values. The method then displays data from the data structure in a data visualization, where each record is displayed using the corresponding selected image. Each selected image is displayed at a location in the data visualization according to the corresponding data in the record.

In accordance with some implementations, at least one query is expanded to include additional terms that are related to the base terms. In some implementations, determining whether two terms are related uses a relatedness metric f that is a function of the two terms. In some implementations, for each additional term $t_a$ in the at least one query there is a base term $t_b$ with $f(t_a, t_b)$ greater than a predefined relatedness threshold value. In some instances, the additional terms include one or more hyponyms (i.e., a word that is more specific than a related general term). In some instances, the additional terms include one or more hypernyms (i.e., a word that is more general that a related specific term). For example, "convertible" is a hyponym of "car," whereas "vehicle" is a hypernym.

In accordance with some implementations, determining whether an additional term is related to a base term uses a confidence function C based on a set of images, where each image in the set of images has metadata that includes the base term. In some implementations, for an additional term $t_a$ and a base term $t_b$, $I(t_a, t_b)$ is the subset of images from an image corpus whose metadata includes the terms $t_a$ and $t_b$ and $I(t_b)$ is the subset of images from the image corpus whose metadata includes the term $t_b$. In some implementations, the confidence function C is computed as $$C(t_a, t_b) = \frac{|I(t_a, t_b)|}{|I(t_b)|}$$

and additional term $t_a$ is related to base term $t_b$ when $C(t_a, t_b)$ is greater than a predefined confidence threshold value.

In accordance with some implementations, for an additional term $t_a$ and a base term $t_b$, $I(t_a, t_b)$ is the subset of images from an image corpus I for which corresponding metadata includes both the additional term $t_a$ and the base term $t_b$, N is the number of images in the corpus I, and additional term $t_a$ is related to base term $t_b$ when $|I(t_a, t_b)|/N$ is greater than a predefined support threshold value.

In accordance with some implementations, at least one query includes a non-base term that was added based on having a semantic relation to the word "symbol" with a semantic relatedness score greater than a predefined symbol threshold. In some implementations, the at least one query includes a field value v (i.e., a value for the field in the data structure). The method identifies a set of words that co-occur adjacent to the word v in a preselected corpus of text in the natural language of the field values. For each word w in the set of words, the method computes a semantic relatedness score between the word w and the word "symbol." The method selects a word in the set of words having the highest semantic relatedness score, and when the semantic relatedness score exceeds a predefined symbol threshold, includes the selected word in the at least one query.

In accordance with some implementations, for at least one of the queries the method identifies a user provided description of the data visualization, which includes a sequence of words. For each word in the sequence of words, the method computes a semantic relatedness score between the word and a field value in the query. When the semantic relatedness score for a word is greater than a predefined description threshold, the word is included in the base terms for the query.

In some implementations, selecting an image from the received images for each of the field values uses clustering. The method clusters the retrieved images into a plurality of clusters using a proximity score for each pair of images, where the proximity score for a pair of images is based, at least in part, on the depth of matching portions of network paths that identify sources for the pair of images. For each field value, the method selects a cluster that contains an image for the field value and selects an image from the cluster, where selecting the cluster is based, at least in part, on the size of the cluster. In some implementations, the method filters out one or more images from the retrieved images prior to clustering. In some implementations, the filtering computes a relevance score for each image by comparing metadata for the image to query terms for the query that retrieved the image, and one or more images with the lowest relevance scores are filtered out. In some implementations, the filtering removes retrieved images that do not have monochromatic backgrounds.

In some implementations, for at least one field value the cluster is selected as the largest cluster that contains an image for the field value. In some implementations, selecting an image from the selected cluster uses a relevance score computed by comparing metadata for each image in the cluster corresponding to the field value to query terms corresponding to the field value. The image selected has the highest relevance score of images in the selected cluster.

In some implementations, for at least one field value, the cluster is selected as the largest cluster that contains an image for the field value with a monochromatic background. In some implementations, for at least one field value, the cluster is selected as the largest cluster that contains an image for the field value with an aspect ratio matching the aspect ratio of a previously selected image for a different field value.

In some implementations, the proximity score for a pair of images is further based, at least in part, on whether the aspect ratios for the pair of images are the same.

BRIEF DESCRIPTION OF THE DRAWINGS

FIGS. 2A, 2B, and 2C illustrate three alternative data structures for storing data used for the data visualizations shown in FIGS. 1A and 1B in accordance with some implementations.

FIG. 4A illustrates that a single word can have multiple word-senses.

FIGS. 4B and 4C illustrate portions of a synonym set hierarchy in accordance with some implementations.

FIGS. 4D and 4E provide specific examples of functions that compute the relatedness of words or word senses in accordance with some implementations.

FIG. 8 illustrates selecting relevant related words based on context in accordance with some implementations.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1A:
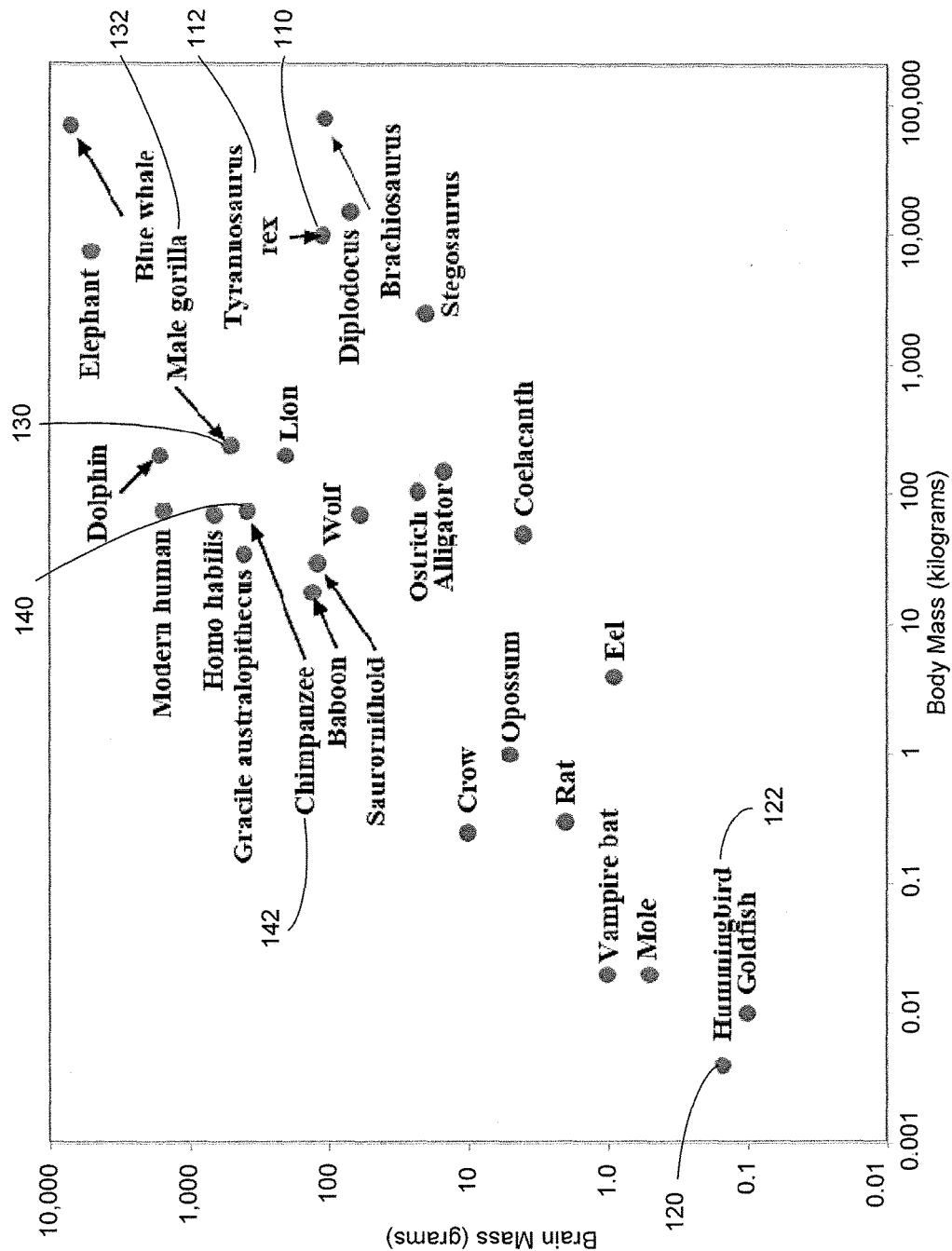
FIGS. 1A and 1B illustrates two alternatives for displaying data in a data visualization according to some implementations.

FIG. 1A is a data visualization that graphically illustrates the relationship between brain mass and body mass for various animals. For each animal, there is a dot for the data point, such as the dot 120 for a hummingbird, and an associated text label, such as the label 122 "Hummingbird." Also displayed are data for the chimpanzee (dot 140 and text label 142), male gorilla (dot 130 and text label 132), and tyrannosaurus rex (dot 110 and text label 112). One goal of this data visualization is to illustrate that the ratio of brain mass to body mass generally correlates to intelligence. The long text labels, closely spaced labels, and the need to use arrows make this visualization hard to read and understand.

Figure 1B:
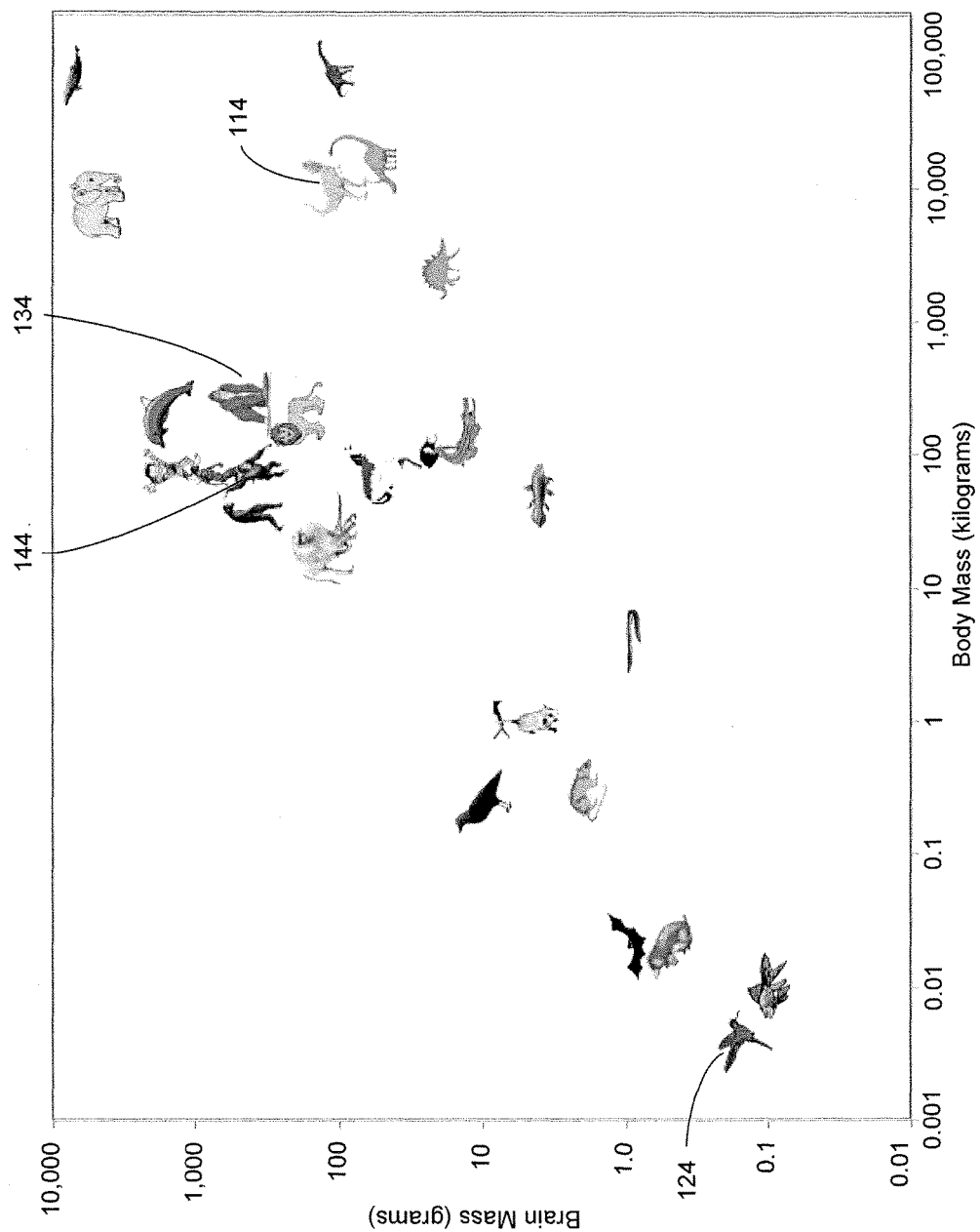

FIG. 1B is a data visualization using the same underlying data, but using an icon for each data point instead of a dot and a text label. A user can easily see the location of each icon, and can quickly recognize what animal each icon represents. For example, the hummingbird icon 124, chimpanzee icon 144, gorilla icon 134, and tyrannosaurus rex icon 114 are easily recognized.

Although a user could manually select icons for use in a data visualization, it could be difficult and time consuming, particularly if there is a large number of data points. Therefore, implementations of the present invention automatically identify appropriate icons as described herein.

FIGS. 2A, 2B, and 2C illustrate three data structures that store the data for the data visualizations in FIGS. 1A and 1B. FIG. 2A shows a spreadsheet 200, with column A 202, column B 204, and column C 206. In practice, the spreadsheet 200 would typically have data in other columns as well. The first row 214 includes names or descriptions for the data in each of the columns. In this example, column A 202 has the field name "Animal" 208, column B 204 has the field name/description "Brain Mass (g)" 210, and column C 206 has field name/description "Body Mass (kg)" 212. Rows 2-5 (216, 218, 220, and 222) provide the actual data for each of the animals. For example, the fourth row 220 includes data for the "Chimpanzee" 228, whose average brain mass is 400 g (232) and average body mass is 75 kg (236). The fifth row 222 includes data for the "Hummingbird" 226, whose brain mass is only 0.15 grams 230 and body mass only 0.004 kilograms 234 (i.e., 4 grams). A person has labeled this worksheet in the spreadsheet 200 as "Animal Data" 224.

The same data from spreadsheet 200 is saved in database table 250 in FIG. 2B. For example, animal table 250 may be stored in a relational database, such as a SQL database. In some implementations, the table 250 includes an animal_id 252, which uniquely identifies a type of animal. The animal table 250 also has a field animal_name 254, which is a name for the animal. The table 250 also includes a brain_mass field 256 and a body_mass field 258. Shown in FIG. 2B are four rows (260, 262, 264, and 266) from the table 250. Just like the spreadsheet 200, the data includes a record/row 264 for the chimpanzee 270, whose average brain mass is 400 grams 274 and whose average body mass is 75 kilograms 278. The table 250 also has a row/record 266 for the hummingbird 268, whose brain mass is 0.15 grams 272 and whose body mass is 0.004 kilograms 276.

The same data from spreadsheet 200 and table 250 can also be stored in an XML file 298 as illustrated in FIG. 2C. The XML file 298 may be for a data visualization that has information about the animals, or the XML file may be a separate file. In this example, row 280 in the XML file 298 indicates that there will be shape encoding using the field "[Animal]," as illustrated in FIG. 1B. The XML file includes animal tags for each of the animals, with additional tags to identify each animal's name, average brain mass, and average body mass. In this illustration, the animal tag at region 282 provides information about Tyrannosaurus Rex, the animal tag at region 284 provides information about the Hummingbird, the animal tag region at 286 provides information about the Male Gorilla, and the animal tag region 288 provides information about the Chimpanzee. This example XML file 298 includes a worksheet tag 290 (similar to a spreadsheet 200) whose name is "Animal Data."

Figure 3:
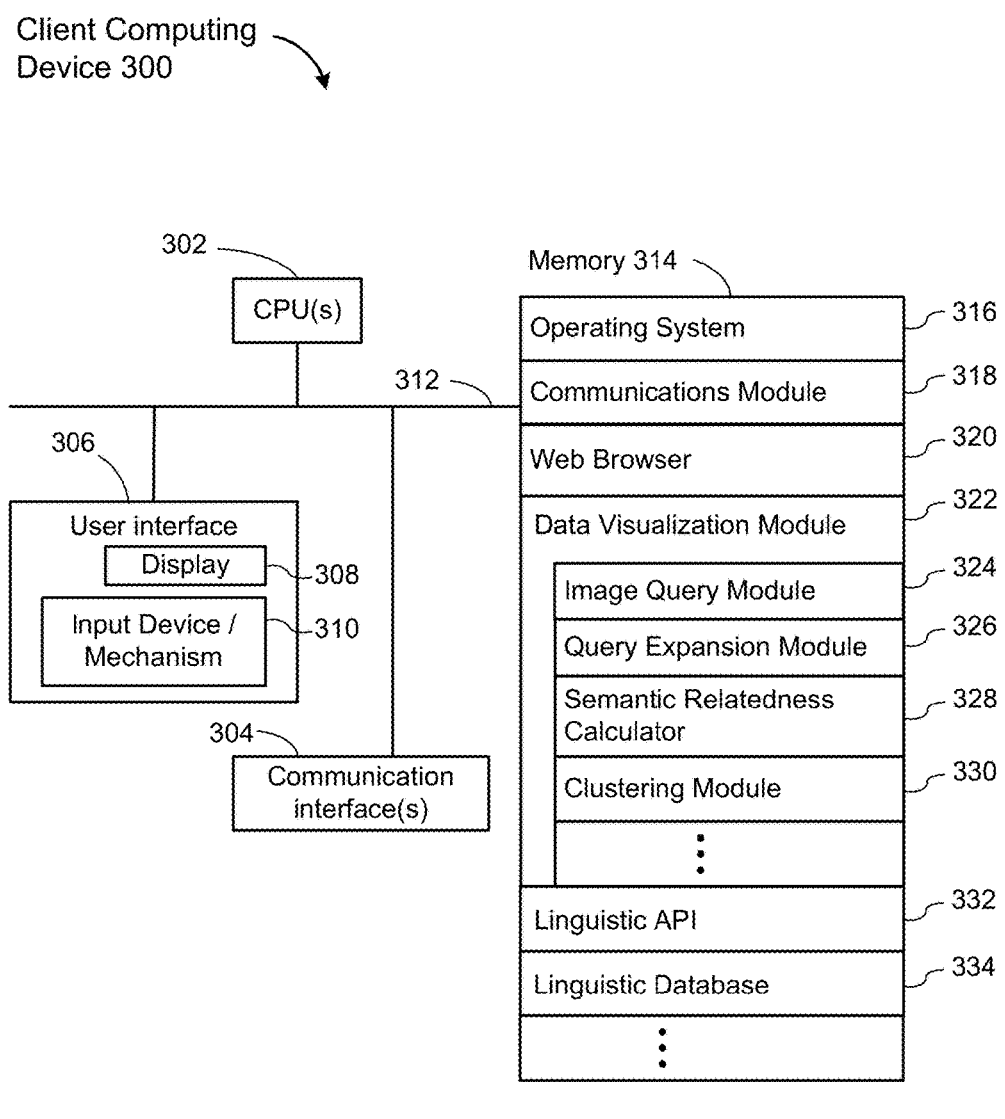
FIG. 3 is a block diagram of a client computing device in accordance with some implementations.

FIG. 3 is a block diagram illustrating a client computing device 300 that a user uses to display data visualizations with semantic icon encoding in accordance with some implementations. A client computing device 300 typically includes one or more processing units/cores (CPUs) 302 for executing modules, programs, and/or instructions stored in memory 314 and thereby performing processing operations; one or more network or other communications interfaces 304; memory 314; and one or more communication buses 312 for interconnecting these components. The communication buses 312 may include circuitry that interconnects and controls communications between system components. A client computing device 300 includes a user interface 306 comprising a display device 308 and one or more input devices or mechanisms 310. In some implementations, the input device/mechanism 310 includes a keyboard; in some implementations, the input device/mechanism includes a "soft" keyboard, which is displayed as needed on the display device 308, enabling a user to "press keys" that appear on the display 308. In some implementations, the display 308 and input device/mechanism 310 comprise a touch screen display (also called a touch sensitive display). In some implementations, memory 314 includes high-speed random access memory, such as DRAM, SRAM, DDR RAM, or other random access solid state memory devices. In some implementations, memory 314 includes non-volatile memory, such as one or more magnetic disk storage devices, optical disk storage devices, flash memory devices, or other non-volatile solid state storage devices. Optionally, memory 314 includes one or more storage devices remotely located from the CPU(s) 302. Memory 314, or alternately the non-volatile memory device(s) within memory 314, comprises a computer readable storage medium. In some implementations, memory 314, or the computer readable storage medium of memory 314, stores the following programs, modules and data structures, or a subset thereof:

- an operating system 316, which includes procedures for handling various basic system services and for performing hardware dependent tasks;
- a communications module 318, which is used for connecting the client computing device 300 to other computers and devices via the one or more communication network interfaces 304 (wired or wireless) and one or more communication networks, such as the Internet, other wide area networks, local area networks, metropolitan area networks, and so on;
- a web browser 320 (or other client application), which enables a user to communicate over a network with remote computers or devices;
- a data visualization module 322, which retrieves data from a data source, then generates and displays the retrieved information in one or more data visualizations. In some instances, a data visualization is displayed with semantically encoded icons, as described in more detail below;
- the data visualization module 322 includes an image query module 324, which uses text-based queries to retrieve matching images (e.g., icons) from an image repository;
- the data visualization module 322 includes a query expansion module 326, which takes a set of query terms, identifies related terms that might be helpful for retrieving appropriate images, and validates which potential expansion terms are helpful to the specific task of retrieving relevant icons. This process is described in more detail below;

in some implementations, the data visualization module 322 includes a semantic relatedness calculator 328, which determines how related two words or word-senses are. In some implementations, the linguistic API 332 provides a function to identify the relatedness of two word-senses, and the semantic relatedness calculator uses that information to calculate the relatedness of two terms. The semantic relatedness calculator 328 is described in more detail below with respect to FIGS. 4A-4E;

in some implementations, the data visualization module 322 includes a clustering module 330. The clustering module enables the system to provide a more consistent set of images for a single data visualization, as described in more detail below with respect to FIGS. 6, 7A, and 7B;

a Linguistic API 332, which provides a set of functions to access a linguistic database 334. In some implementations, the Linguistic API 332 is provided locally on the client computing device 300, but in other implementations, the Linguistic API 332 is provided only by the Linguistic Server 906. The Linguistic API 332, whether available from the client computing device 300 or from the linguistic server 906, is described in more detail below in FIGS. 9 and 10; and a Linguistic database 334, which stores data about synonym sets and relations between synonyms sets. In some implementations, the Linguistic database 334 is stored locally on the client computing device 300, but in other implementations the linguistic database 334 is stored in a linguistic database 334 accessed by a linguistic server 906. The linguistic database 334 is described in more detail below with respect to FIGS. 9 and 10.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 314 may store a subset of the modules and data structures identified above. Furthermore, memory 314 may store additional modules or data structures not described above.

Although FIG. 3 shows a client computing device 300, FIG. 3 is intended more as a functional description of the various features that may be present rather than as a structural schematic of the implementations described herein. In practice, and as recognized by those of ordinary skill in the art, items shown separately could be combined and some items could be separated.

FIG. 4A illustrates synonym sets, which are also called "synsets." A synonym set identifies a single word-sense (a specific meaning) and identifies other synonyms for each word sense. Sometimes a word-sense is referred to as a "concept." FIG. 4A illustrates the synsets for the word "car" 400. First, in this taxonomy, five different word senses for car have been identified, corresponding to the five illustrated bullets 402, 404, 406, 408, and 410. Then for each of these five word senses, other synonyms are identified, as well as a brief definition (or "gloss") and a sample usage. The first synset 402 corresponds to the common use of "car" as a vehicle that people drive. The other synsets illustrate that "car" can be used to identify a railway car (synset 404), a gondola (synset 406), an elevator car (synset 408), and a cable car (synset 410). The information in FIG. 4A is from WordNet 3.0, Copyright 2006 by Princeton University.

Figure 4B:
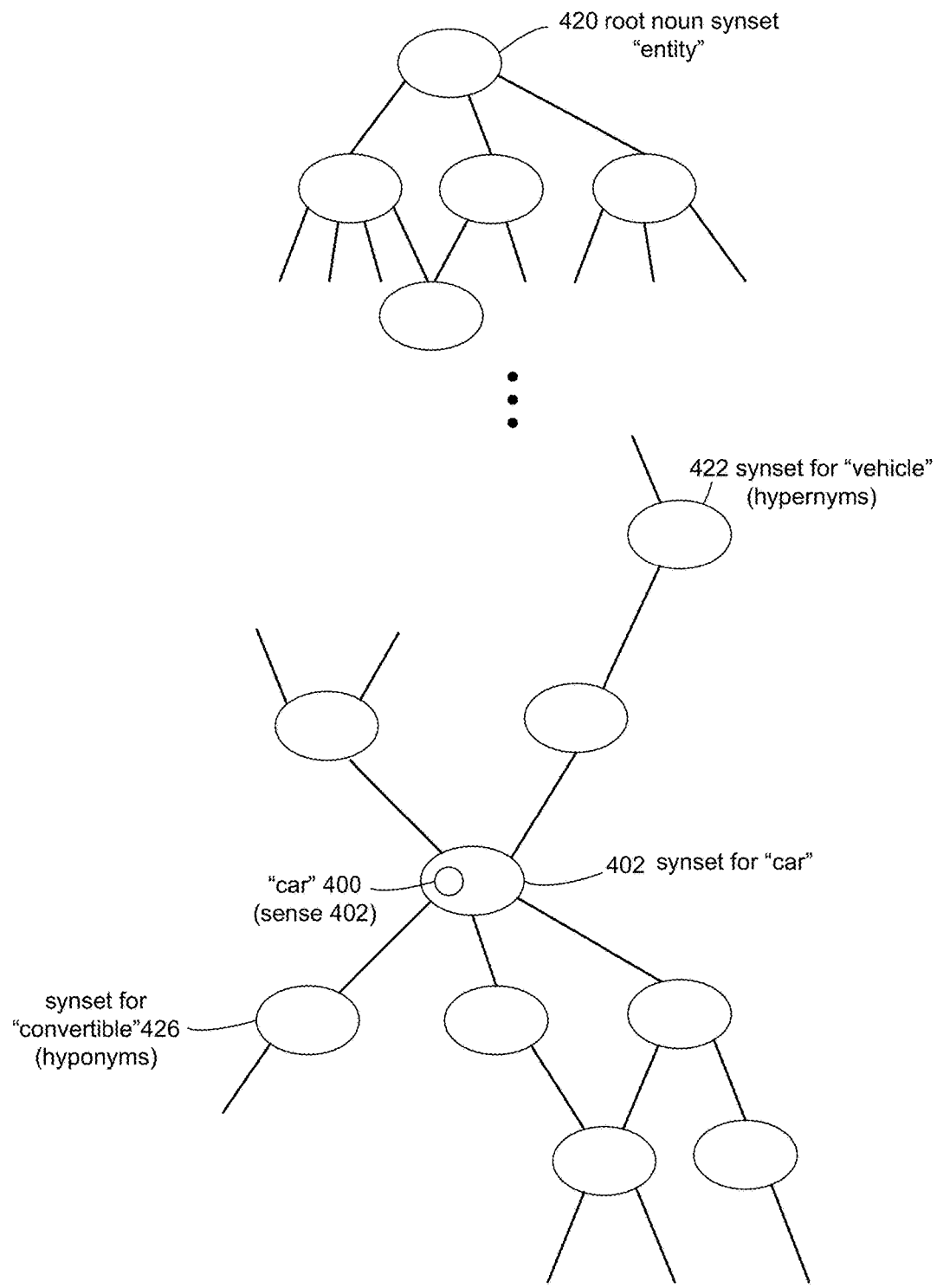

FIG. 4B illustrates the hierarchy of synsets graphically. Synsets are in different hierarchies depending on which part of speech they represent. For example, some systems include distinct synset hierarchies for nouns, verbs, adjectives, and adverbs. The hierarchy illustrated in FIG. 4B is for nouns. In this example, the root synset 420 corresponds to the word "entity." Here, "entity" is the most abstract concept (i.e., every noun is some type of entity). Going down the hierarchy corresponds to more and more specific nouns.

Somewhere in the hierarchy is the synset 402 corresponding to the word "car" 400 in the word-sense "automobile." Below the synset 402 in the hierarchy are more specific synsets, such as the synset 426 for "convertible." The more specific terms, such as "convertible" are called hyponyms of "car." On the other hand, further up in the hierarchy are more abstract synsets, such as the "vehicle" synset 422. The terms in this more abstract synset are called hypernyms of "car."

FIG. 4C illustrates a process for computing the relatedness of two synsets in a synset hierarchy. This synset hierarchy is for nouns, with root synset 420. A first synset $c_1$ 442 and a second synset $c_2$ 444 are located somewhere in the hierarchy. The least common subsumer (LCS) 446 for the synsets 442 and 444 is the lowest node in the hierarchy that is hierarchically above both of the synsets (i.e., there are paths from each synset 442 and 444 to the least common subsumer 446 where each path proceeds strictly upwards). Note that for every pair of synsets in the hierarchy, there is a least common subsumer. The root synset 420 is a common subsumer for all of the synsets in the hierarchy, and because the number of synsets is finite, there must be a least one. Once the least common subsumer 446 is identified, there are three relevant depths. The depth 452 of the synset 442 is the number of links between the synset 442 and the least common subsumer 446. Similarly, the depth 454 of the synset 444 is the number of links between the synset 444 and the least common subsumer 446. Finally, the depth 456 of the least common subsumer 446 is the number of links between the least common subsumer 446 and the root synset 420. These depths will sometimes be referred to as $N_1$, $N_2$, and $N_3$. Note that these depths can be zero. For example, if the least common subsumer is the root synset 420, then the depth of the least common subsumer is zero (there are no links between the least common subsumer and the root).

FIG. 4D illustrates a formula for computing the relatedness (472) of two synsets in accordance with some implementations. This specific formula in FIG. 4D was described in "Verb Semantics and Lexical Selection" by Zhibiao Wu and Martha Palmer at page 136. The values range from 0 (not related at all) to 1(identical synsets). Using the depths $N_1$, $N_2$, and $N_3$ as described with respect to FIG. 4C, a relatedness formula $R(c_1, c_2)$ can be computed as shown in FIG. 4D. The numerator is $2N_3$, and the denominator is $N_1+N_2+2N_3$. Some examples show how this formula coincides with intuition about the relatedness of two synsets 442 and 444. First, if the least common subsumer is the root synset 420, then the two synsets are not related. In this case, $N_3=0$, so the formula computes the relatedness as 0. Second, suppose the two synsets 442 and 444 are the same. In that case, the least common subsumer 446 is the same as the two synsets 442 and 444, so the depths $N_1$ and $N_2$ are both zero. In this case, the formula reduces to $2N_3/2N_3=1$.

In a third example, note that when $N_1$ and/or $N_2$ are large, the denominator is large, so the fraction is small, indicating that the two synsets 442 and 444 are not very related. Finally, the depth of the least common subsumer 446 corresponds to relatedness in this way: the smaller the depth, the greater the abstractness required to have the two synsets related. Conversely, the greater the depth of the least common subsumer 446, the more specific are the similarities between the synsets. The formula in FIG. 4D is consistent with this: as the depth $N_3$ approaches 0, the relatedness approaches 0; and as the depth $N_3$ get very large, the relatedness approaches 1 because $2N_3$ becomes the dominant term in the denominator.

Of course the specific formula in FIG. 4D is merely exemplary, and not required by implementations of the present invention. One of ordinary skill in the art recognizes that many other similar formulas can be used, some of which are minor variations (e.g., replace $2N_3$ with $1.5N_3$ in the formula of FIG. 4D) and others that use more complex functions (e.g., exponential functions).

FIG. 4E illustrates a way to convert the relatedness of synsets into a formula for the relatedness (474) of individual words (terms). Because a single term can have multiple word-senses, if there is no context to determine the appropriate word-sense, all of the word-senses should be considered. When determining the relatedness of two terms, all of the word-senses of both terms should be evaluated. For example, when a term $t_1$ has 3 word-senses and a term $t_2$ has 4 word senses, there are 12 distinct synset comparisons.

As illustrated in FIG. 4E, one way to combine all of the synset comparisons is to take the maximum. In this implementation, two terms are considered to be related as closely as their closest synsets. For example, if there are 12 synset comparisons as in the example above, the synset relatedness function R from FIG. 4D is computed for each pair, and the maximum is used as the relatedness of the underlying terms. In FIG. 4E, the notation $S(t_1)$ is the set of all synsets that contain the term $t_1$ and $S(t_2)$ is the set of all synsets that contain the term $t_2$. The $c_i$ range over all of the synsets in $S(t_1)$ and the $d_j$ range over all of the synsets in $S(t_2)$.

Other embodiments compute the relatedness (474) of terms in other ways based on the relatedness of the underlying synsets. For example, rather than taking the maximum of the synset relatedness calculations, some implementations use an average or a weighted average. For example, some implementations use the average of the top 3 synset relatedness calculations.

Figure 5:
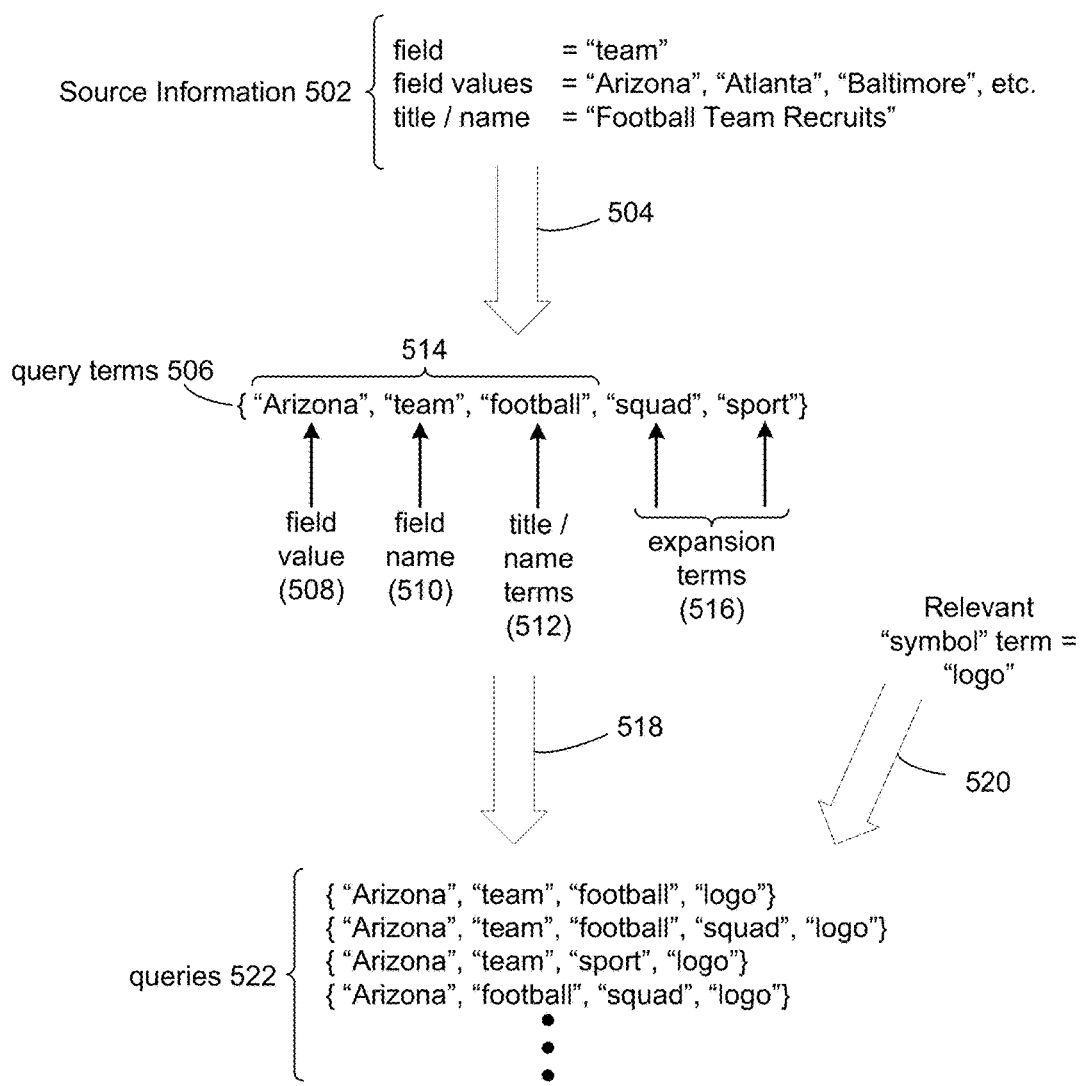
FIG. 5 illustrates conceptually how some implementations develop sets of query terms for retrieving relevant images.

FIG. 5 illustrates how query terms are identified in some implementations. At the outset, certain source information 502 is retrieved from a data structure and/or metadata about the data structure. The source information 502 relates to a specific field, which has a field name 510. Within the field are stored field values 508 (e.g., one field value per record in the data structure). The source information also includes a user-defined title or description, such as the worksheet description 224 in FIG. 2A, the table name 250 in FIG. 2B, or the worksheet name 290 in FIG. 2C. The process in FIG. 5 builds (504) a set of query terms 506 that comprises a set of base terms 514 and a set of expansion terms 516. The base terms 514 include the field name 510 and a field value 508 from a single record in the data structure. In addition, one or more title/name terms 512 may be selected from a name, title, or description. In this example, the title is "Football Team Recruits," and the word "team" is already included as a base term, so only "football" and "recruits" are evaluated for inclusion in the set of base terms 514.

In some implementations, potential title terms are selected based on semantic relatedness to either the field name 510 or the field value 508. In this example, semantic relatedness is computed between the field name "team" 510 and the terms "Football" and "Recruits." Using the formula from FIG. 4E, the semantic relatedness of "football" and "team" is 0.834, whereas the semantic relatedness of "recruits" and "team" is only 0.427. In this case, the term "football" 512 is thus added. In some implementations, any title words that have semantic relatedness to the field name 510 of at least 0.65 are added to the set of base terms 514. Other implementations use various threshold values instead of 0.65, such as 0.60, 0.70, or 0.75. In some implementations, the threshold value is preselected based on empirical analysis of sample data sets. Note that the added terms could include more than one term 512, or no title terms at all.

Some implementations add expansion terms 516 to the base terms 514. The candidate expansion terms come from three places in the synset hierarchy. First, the set of candidate terms includes the synonyms of the base terms (i.e., terms that are in the synsets for each of the base terms). Second, the set of candidate terms include hypernyms of the base terms. This is illustrated in FIG. 4B. Third, the set of candidate terms includes hyponyms of the base terms, which is also illustrated in FIG. 4B. In some implementations, hypernyms and hyponyms are limited to those within a certain threshold proximity of the base terms (e.g., within 2 links).

The set of candidate terms may be large, and the terms are not necessarily helpful for querying a database of images. Therefore, some implementations use one or more tests of the candidate query terms based on a set of images I and corresponding metadata. Sometimes the set I is referred to as an image corpus.

In one test, a confidence is computed that essentially measures how closely the candidate term is to a base term according to the images in the image corpus. If the metadata for the images show that the candidate term and base term frequently occur together for individual images, then the candidate term is generally relevant. Conversely, if the candidate term and base term are not found together, then the candidate term is not sufficiently relevant. If $I(t_b)$ is the subset of images from I whose metadata include the base term $t_b$ and $I(t_a, t_b)$ is the set of images from I whose metadata includes both the candidate additional term $t_a$ and base term $t_b$, then the confidence may be defined as $$C(t_a, t_b) = \frac{|I(t_a, t_b)|}{|I(t_b)|}$$

where $|I(t_a, t_b)|$ indicates the cardinality of the set $I(t_a, t_b)$ and $|I(t_b)|$ indicates the cardinality of set $I(t_b)$. Note that $I(t_a, t_b) = I(t_a) \cap I(t_b)$. In some implementations, a confidence of 0.6 or greater is required for a candidate additional term $t_a$ to be included in the set of expansion terms 516. Other implementations use different confidence thresholds, such as 0.55, 0.65, or 0.70. Some implementations adjust the confidence threshold over time based on feedback.

In a second test, a support metric is computed that essentially compares the number of images whose metadata includes a candidate additional term $t_a$ and base term $t_b$ to the size of the image corpus I. If the total number of images whose metadata includes both $t_a$ and $t_b$ is too small, then the candidate additional term $t_a$ is not included in the set of expansion terms 516. In some implementations, the support function S is defined as $$S(t_a, t_b) = \|(t_a, t_b)\| / |I|$$

In some implementations, when the computed value of the support function is at least 0.04, the candidate additional term is included, but when the computed value is less than 0.04, it is excluded. Other implementations use different support thresholds, such as 0.03 or 0.05. Some implementations adjust the support threshold over time based on feedback. In some implementations, both the confidence function C and support function S are applied, and a candidate additional term is included only when the term satisfies both tests.

In the illustration of FIG. 5, the term "squad" is sufficiently correlated to "team" and the term "sport" is sufficiently related to "football," so both of these terms are included in the expansion terms 516 as part of the set of query terms 506.

In addition to the query terms already identified, some implementations include an additional "symbol" term to indicate that the queries are searching for symbols. In some implementations, the term "symbol" is included in each of the queries. In some implementations, "clipart" is added as a query term or specified as a query parameter. Other implementations use a two-step process to identify candidate "symbol" terms and add one of the candidate terms based on semantic relatedness. In some implementations, candidate symbol terms are identified from a lexical corpus by co-occurring adjacent to one of the query terms 506. When n terms occur in an adjacent sequence, it is sometimes referred to as an n-gram (e.g., a bi-gram refers to a pair of adjacent terms). For example, if one of the query terms were "tea," the candidate symbol terms could include "cup," "hot," "bag," and "leaves," assuming the bi-grams "tea cup," "hot tea," "tea bag," and "tea leaves" were in the lexical corpus. In some implementations, the candidates are limited based on the frequency of co-occurrence or limited to a certain number (e.g., the top three co-occurring terms in tri-grams).

The candidate symbol terms are then evaluated for semantic relatedness to the term "symbol." This is illustrated in FIG. 8. In this illustration, three input terms 802 (i.e., country 810, company 812, and stock 814) are identified, as well as two or three top co-occurring words 804. For each co-occurring term, the relatedness 806 to "symbol" is computed (e.g., using the formula in FIG. 4E). For input term "company" 812, the three top co-occurring words are "logo" 820, "office" 822, and "employees" 824. The word "logo" 820 has a 0.9844 (830) semantic relatedness to "symbol," which is much higher than the 0.4153 (832) semantic relatedness for "office" 822 or the 0.1230 (834) semantic relatedness for "employees" 824. Therefore, for input term "company" 812, the selected symbol term is "logo" 820.

Similarly, for input term "stock" 814, the two top co-occurring terms are "ticker" 826 with relatedness 0.9738 (836) and "market" 828 with relatedness 0.3181 (838). In this case, "ticker" 826 would be selected as the appropriate "symbol" term. Note that the final decision on which co-occurring term to select is based on the relatedness to "symbol" and not on how frequently the term occurs. For example, "stock market" may occur more frequently than "stock ticker," but "ticker" 826 is more closely related to "symbol" than "market" 828. Note that in some cases none of the candidate symbol terms will be sufficiently related to "symbol." In these cases, a fall-back technique is to use the term "symbol" itself, use "clipart," use "clipart" as a query parameter, or use no symbol term at all.

Referring back to FIG. 5, for the query terms 506, the co-occurring terms include "logo" (e.g., in "team logo"), which is closely related to "symbol," so it is included (520) in the queries 522. In some implementations, each query includes a subset of the query terms 506 plus the symbol term (e.g., "logo" is included in each of the queries here).

Figure 6A:
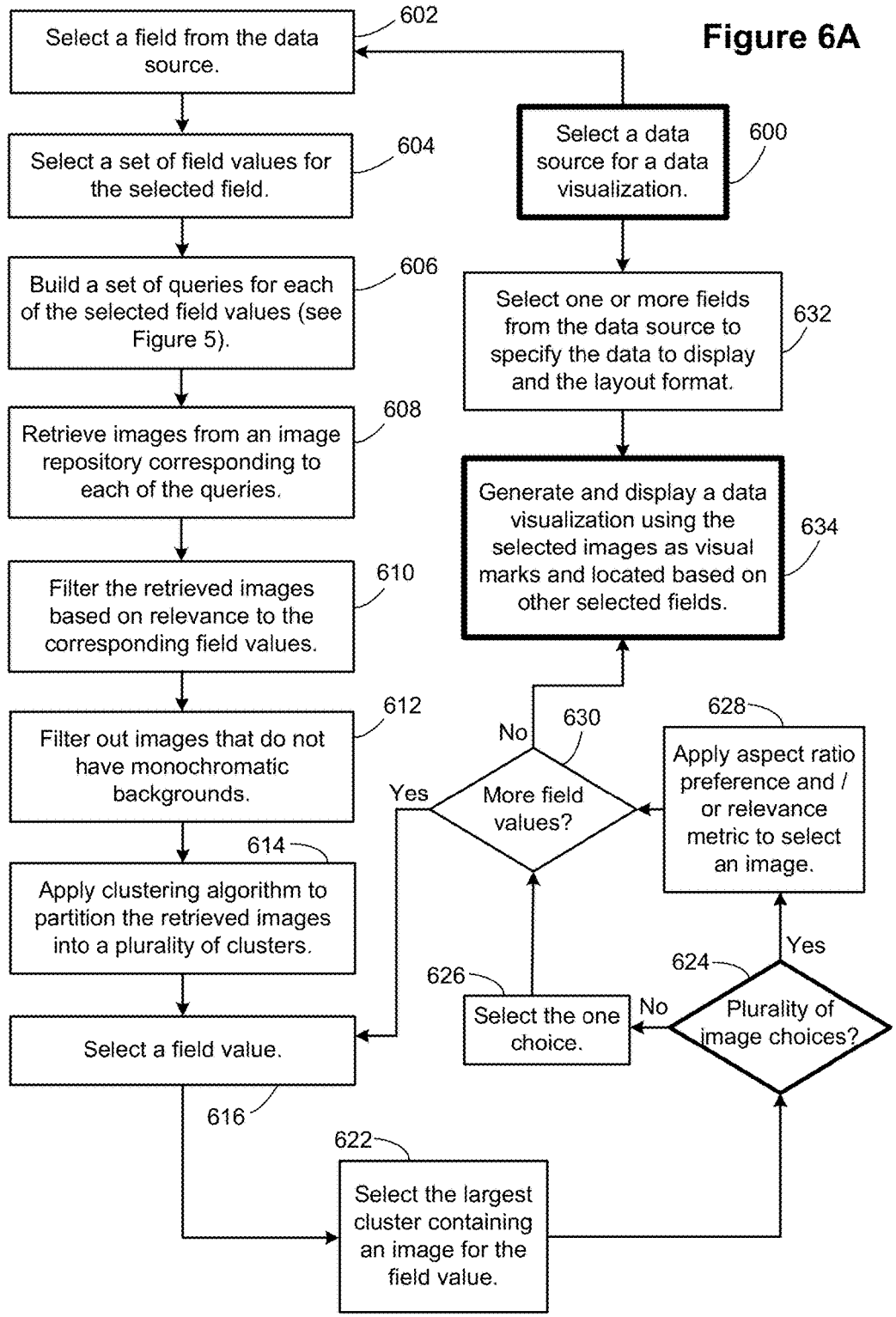
FIGS. 6A and 6B are two alternative flowcharts for building a data visualization that encodes data using semantically relevant icons in accordance with some implementations.

FIG. 6A is a flowchart for building a data visualization that encodes data using semantically relevant icons in accordance with some implementations. The process begins by selecting (600) a data source for a data visualization, such as a spreadsheet 200, table 250, or XML file 298, as illustrated in FIGS. 2A, 2B, and 2C. A user selects (602) a field from the data source for use in a data visualization, such as field name 510 in FIG. 5. A set of field values 508 are selected (604) from the selected field. In some cases, all of the field values for the selected field are used, but in other instances the set of records is filtered so that only a subset of the field values are used. For example, FIG. 5 illustrates a scenario where the field values are college football teams. A data visualization could limit the data to just the colleges in the Pac-12 Conference, in which case the value "Arizona" would be included, but "Atlanta" and "Baltimore" would not be included.

The process then builds (606) a set of queries as illustrated in FIG. 5. For each of the queries, the process retrieves (608) images from an image repository corresponding to the query. Typically the query terms are matched to the metadata associated with the images. The image repository may be locally stored, on the user's local network, or on a publicly available website (e.g., images.google.com), or may be saved in a proprietary database. In some implementations, the retrieved images are filtered (610) based on relevance to the corresponding field values (e.g., comparing the image metadata to the query terms or using a repository-supplied relevance metric). In this implementation, the process filters out (612) any images that do not have a monochromatic background. Empirically, the best icons for a data visualization are simpler cartoon-like images with simple colors, whereas photographic images with fine-grain color are not easily recognized. Requiring a monochromatic background is effective at filtering out the photographic images.

After any filtering has been applied, the remaining images (for all of the field values) are clustered (614) together into a plurality of clusters. Within a data visualization, multiple icons are selected, and it is helpful to have icons that follow a consistent theme. Some implementations use a group average agglomerative clusterer (GAAC) algorithm to perform the clustering. In some implementations, the clustering process begins by designating each individual image as a singleton cluster. Then, the two "closest" singleton clusters are merged into one cluster. The process continues, combining the two closest clusters at each stage until a stopping point is reached. In some implementations, the algorithm stops when there are 4 clusters remaining. In some implementations, the algorithm stops with a larger number of clusters and/or stops when there are no clusters that are sufficiently close. Some implementations empirically determine an optimum stopping point based on feedback from previous usage of the algorithm.

Figure 7A:
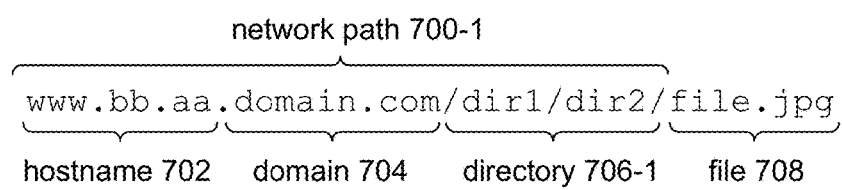
FIGS. 7A and 7B illustrate two ways to identify the location of a file within a network in accordance with some implementations.
Figure 7B:
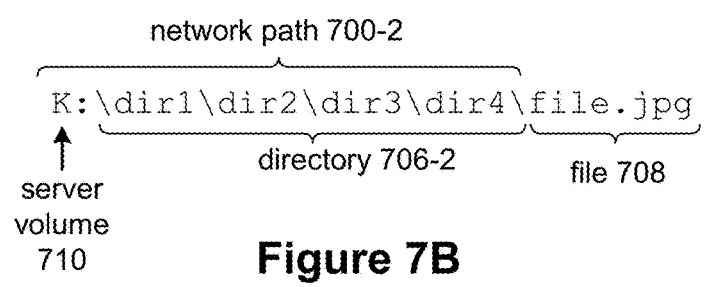

In some implementations, the "closeness" of two images or clusters is determined by the network paths of the images. In this regard, images from the same source (e.g., network location) are more likely to have a consistent look. Therefore, closeness is measured by the network paths 700 of the images. This is illustrated in FIGS. 7A and 7B. In FIG. 7B, a file named file.jpg 708 is stored on a network file server 710 (assigned drive letter K) in the directory structure \dir1\dir2\dir3\dir4 706-2. The server 710 and directory 706-2 comprise the network path 700-2. In some implementations, the closeness of two images that are stored on network drives is based on the server volumes 710 and directories 706-2. For example, two files 708 that are stored on different server volumes 710 are not close. If the server volumes 710 are the same, then the directories 706-2 are compared. The greater the overlap of the directory structure from the root, the "closer" the images. For example, two images stored on server volume K 710 in the same directory \dir1\dir2\dir3\dir4 are fairly close. If a second image were on server volume K, but in directory structure \dir1\dir2\dir7\dir8\dir9, then the directory structure would only overlap the first two directories from the root, so not as close as the previous example.

In some instances, the network path 700-1 is specified by a hostname 702, a domain name 704, and a directory 706-1, as illustrated in FIG. 7A. The closeness is computed in a way similar to FIG. 7B, but the starting point is the domain name 704, which appears in the middle of the network path 700-1. To compare the closeness of two files, the domain names 704 are compared first. If they are the same, the host names 702 are compared. The host names are effectively read backwards, beginning with the portion closest to the domain name 704. When the host name 702 has multiple segments separated by dots, each of the segments is evaluated like a directory. For example, a hostname of www.bb.aa has only one level of overlap with www.aa, which is the "aa" segment. Note that the "www" at the beginning does not create an additional level of overlap here because it is the third level segment in www.bb.aa, whereas it is the second segment in www.aa. When both the domain name 704 and the hostname 702 are the same, the directory 706-1 is then considered, and the overlap is calculated in the same way as directory 706-2 in FIG. 7B.

In some implementations, the closeness of two images is computed as an integer, which is the sum of the overlapping components from the network paths 700. In some implementations, the aspect ratio is another part of the closeness calculation. Specifically, if the aspect ratios of two images are the same, then it adds to the closeness. If the aspect ratios are different, then it does not add to the closeness calculation (or subtracts). In some implementations, the aspect ratio comparison is combined with the network path closeness using a weighted sum. In some implementations, the weights are the same (e.g., having the same aspect ratios counts as "1" and each level of network path overlap counts as "1" as well.

Once the images are partitioned into clusters, the process selects an image for each of the field values. A first field value is selected (616). The process then selects (622) the largest cluster containing an image for the field value. Once a cluster is selected, there are one or more choices for an image corresponding to the field value. When there is (624) only one choice, that choice is selected (626). When there are (624) two or more choices, the process uses (628) an aspect ratio preference and/or a relevance metric to select an image. For example, if images have been previously selected with a certain aspect ratio, then there is a preference to select additional images with the same aspect ratio. Similarly, a relevance metric may be used (e.g., provided by the image repository in response to a query or determined by comparing the image metadata to the field value). If there are (630) more field values, the process repeats to select images for the additional field values.

In addition to selecting (600) a data source, the user also selects (632) one or more fields from the data source to specify the data to display and the layout format (e.g., what type of graphic and what data does the graphic represent). The data visualization application 322 then generates (634) and displays (634) a data visualization using the selected images as visual marks, and locates those marks in the data visualization based on the other selected fields.

Figure 6B:
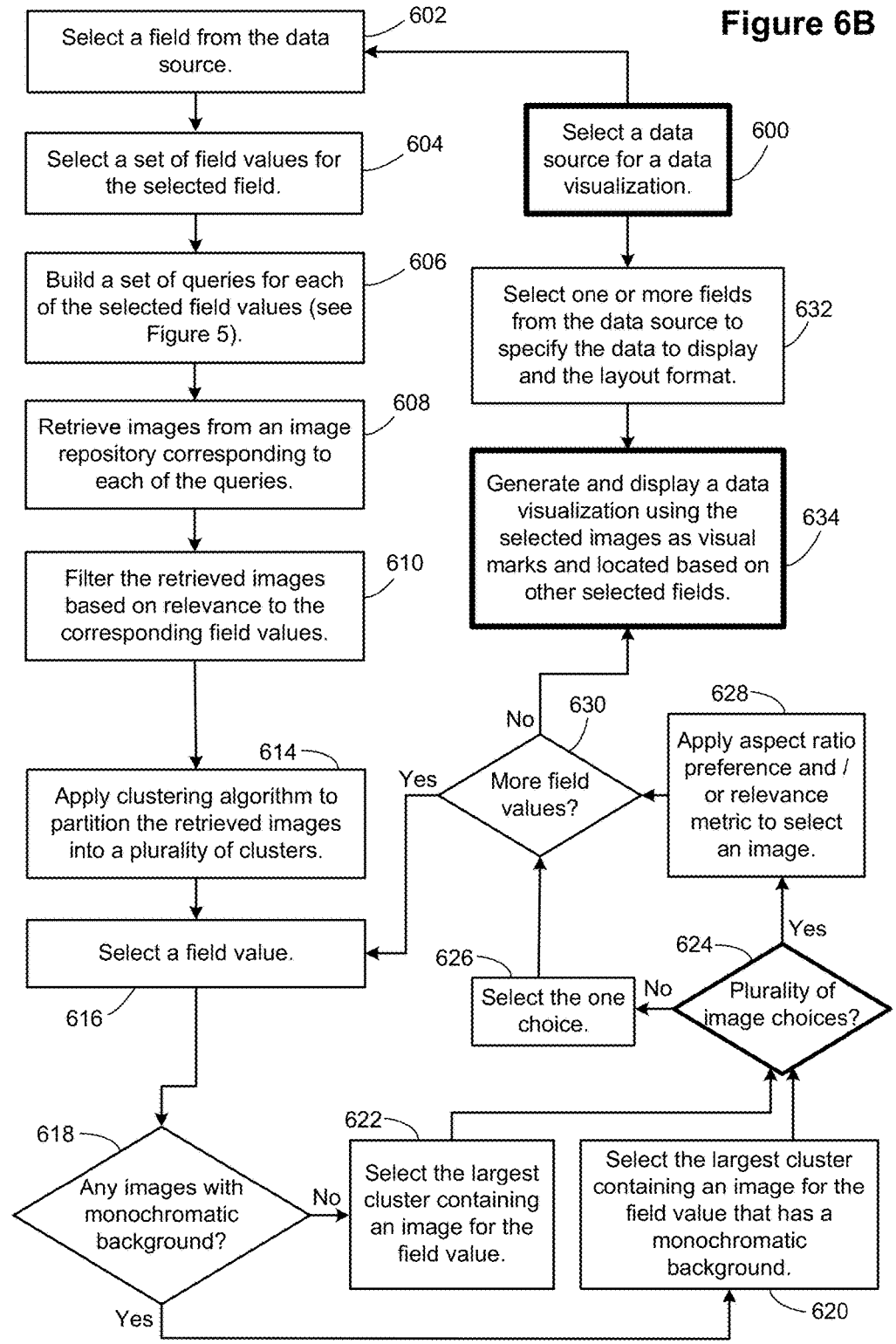

FIG. 6B is an alternative flowchart for building a data visualization that encodes data using semantically relevant icons in accordance with some implementations. This implementation is similar to FIG. 6A, but handles the issue of monochromatic backgrounds differently. In the implementation of FIG. 6B, the images without monochromatic backgrounds are kept and included in the clustering (614) process. Once the images are partitioned into clusters, the process selects an image for each of the field values. A first field value is selected (616). The process determines (618) whether there are any images for the selected field value with a monochromatic background. If not, the process selects (622) the largest cluster containing an image for the field value. When there is at least one image with a monochromatic background, the process selects (620) the largest cluster containing an image for the field value, where at least one of the images (for the field value) has a monochromatic background. The remainder of the flowchart is as described above with respect to FIG. 6A.

In some implementations, the user is consulted for guidance when automatic selection does not have sufficiently high confidence or when no relevant images can be found. Some implementations include a feedback mechanism so that a user can indicate the quality of the selected icons and/or allow the user to override the automatic selections.

Figure 9:
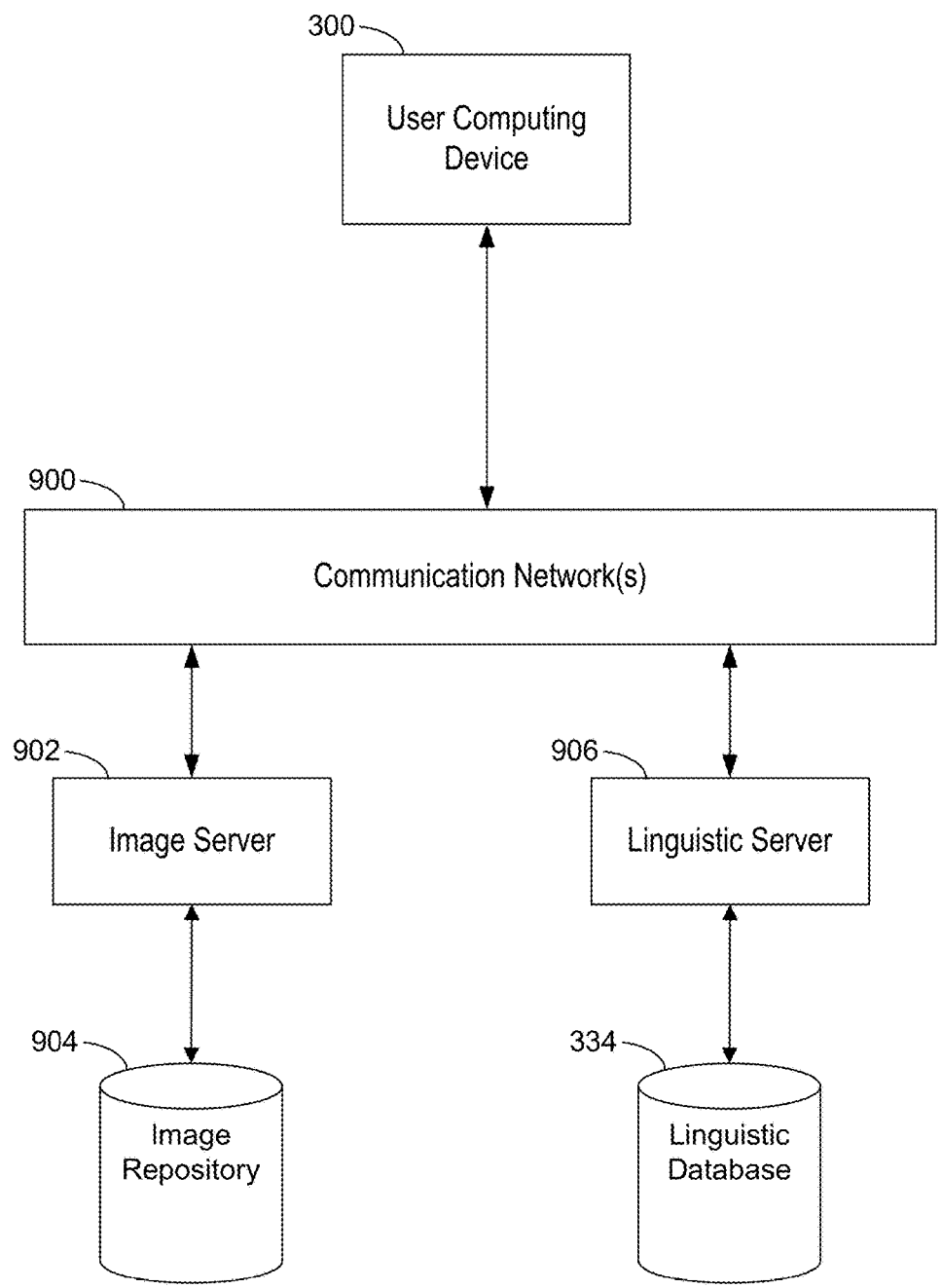
FIG. 9 illustrates conceptually a context in which some implementations operate.

FIG. 9 illustrates conceptually a context in which some implementations operate. A user computing device 300 with a data visualization module 322 is connected to a communication network 900. Also connected to the network 900 is an image server 902, which retrieves images from an image repository 904 according to received queries. This is described in more detail with respect to FIG. 10. Also connected to the network is a linguistic server 906, which provides various functionality based on data in a linguistic database 334. This is described in greater detail with respect to FIG. 10. In some implementations, the linguistic database 334 and/or linguistic API functionality 332 are provided by the client device 300 itself, as noted above in FIG. 3.

Figure 10:
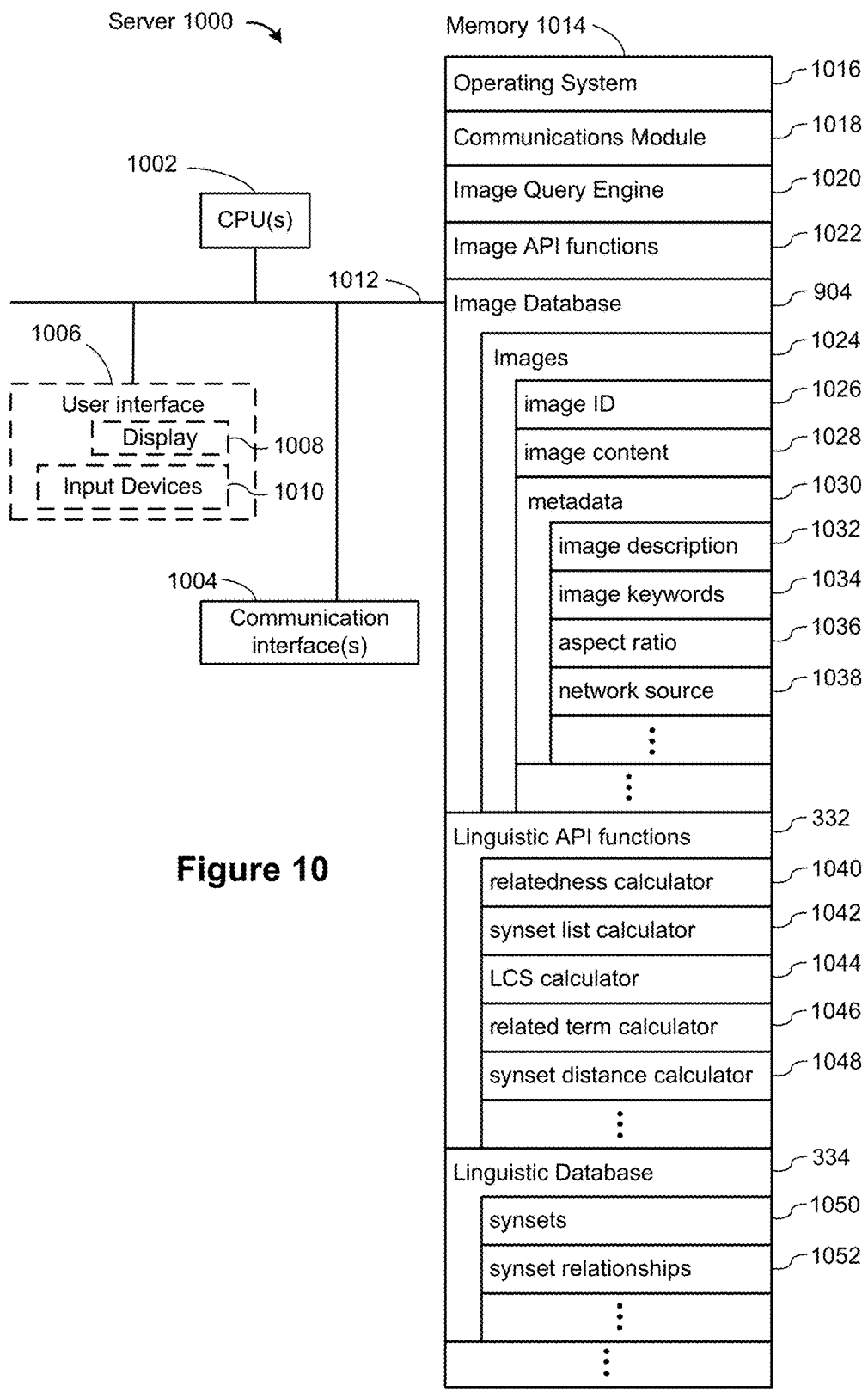
FIG. 10 is a block diagram of a server that may operate as an image server or linguistic server in accordance with some implementations.
Figure 11A:
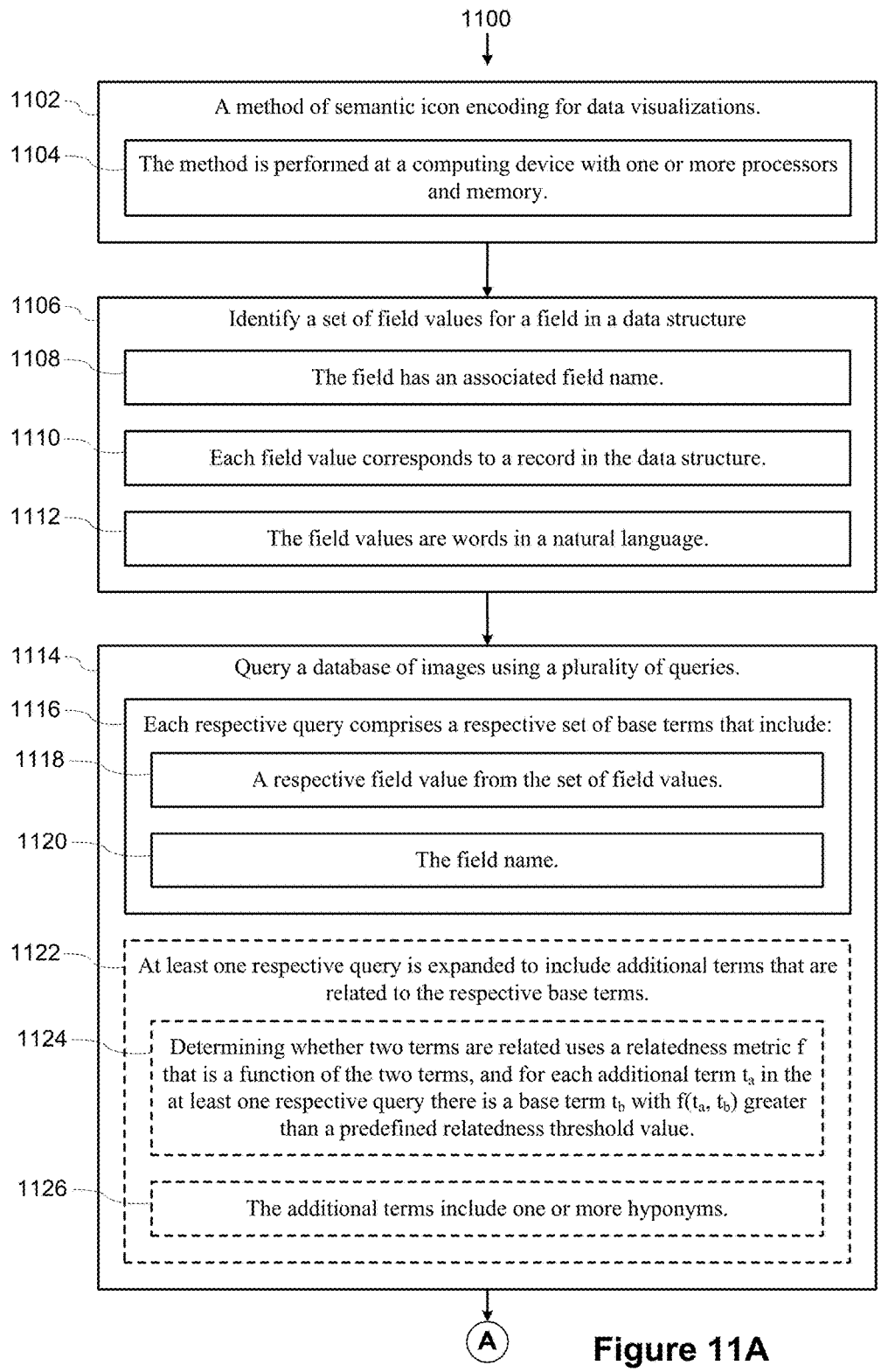
FIGS. 11A-11F provide a flowchart of a process, performed at a client computing device, for generating and displaying a data visualization with semantic icon encoding in accordance with some implementations.
Figure 11B:
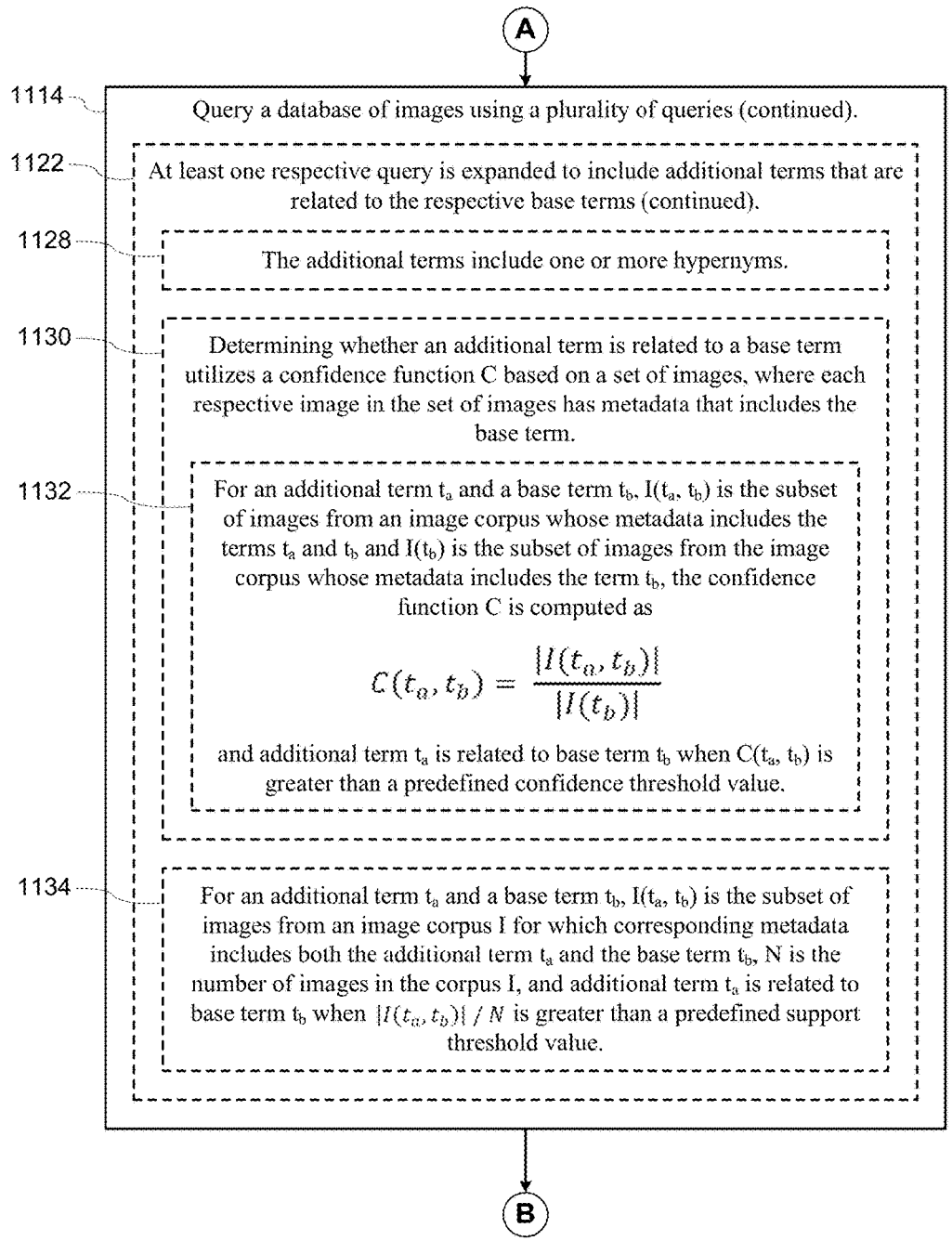
Figure 11C:
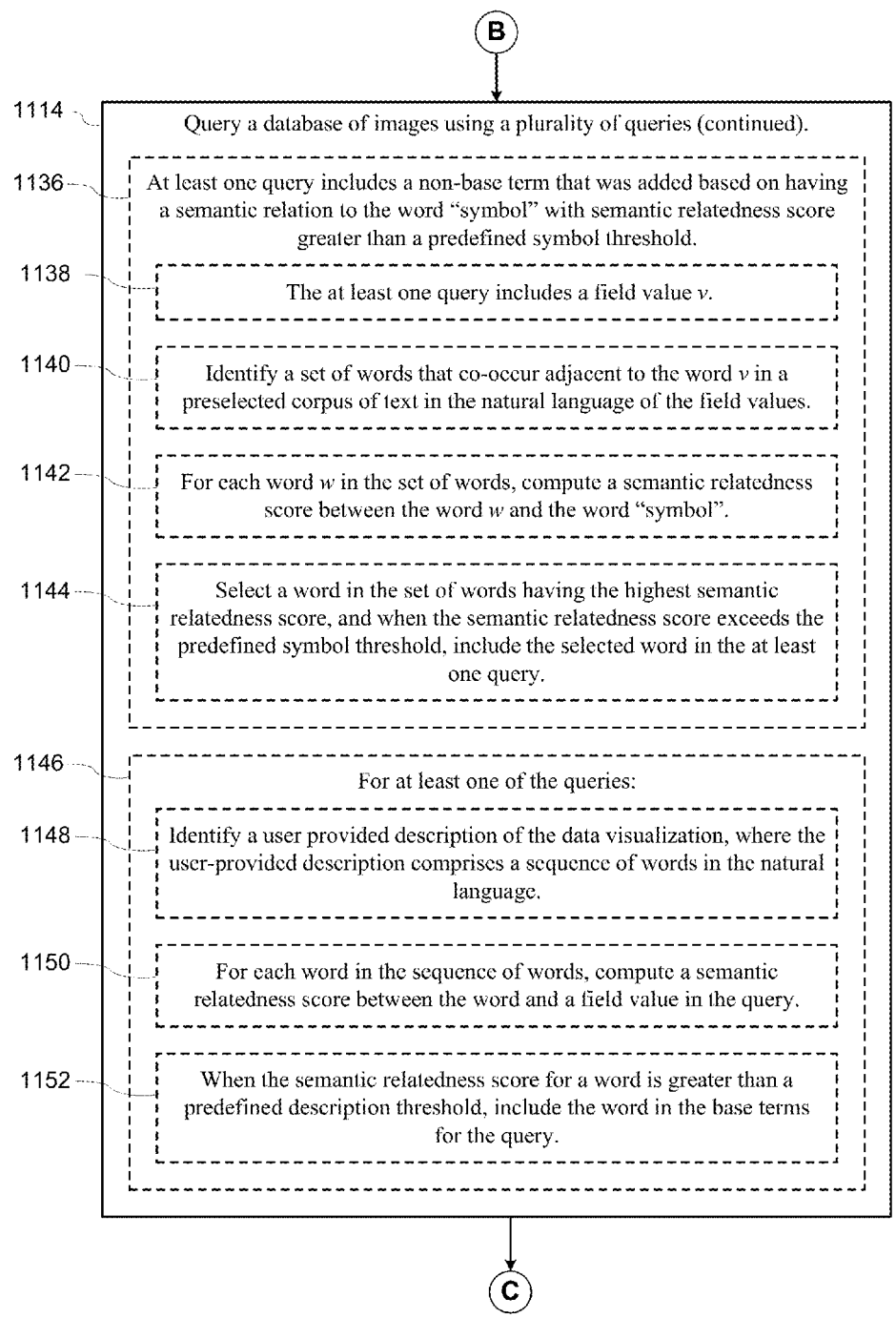
Figure 11D:
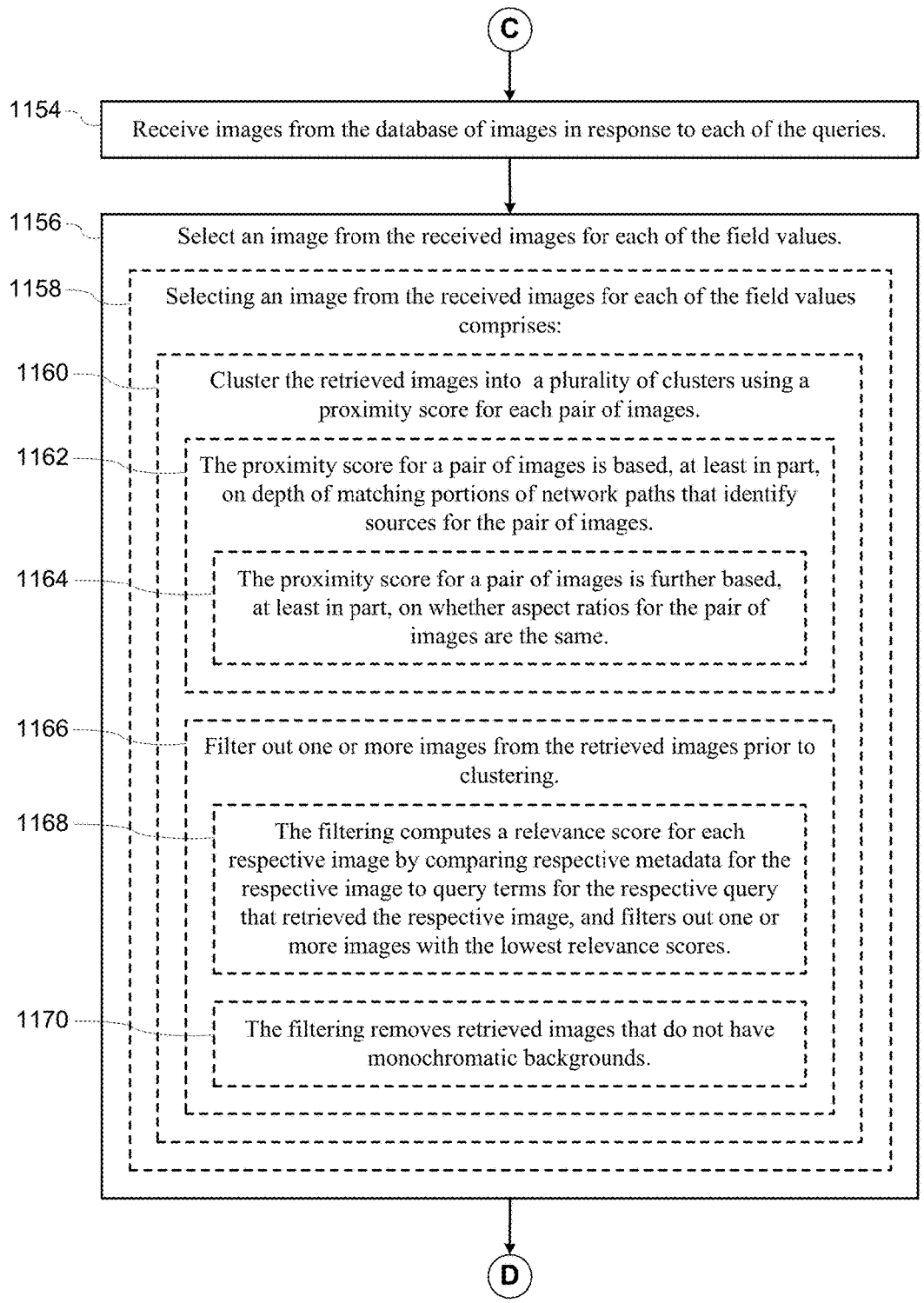
Figure 11E:
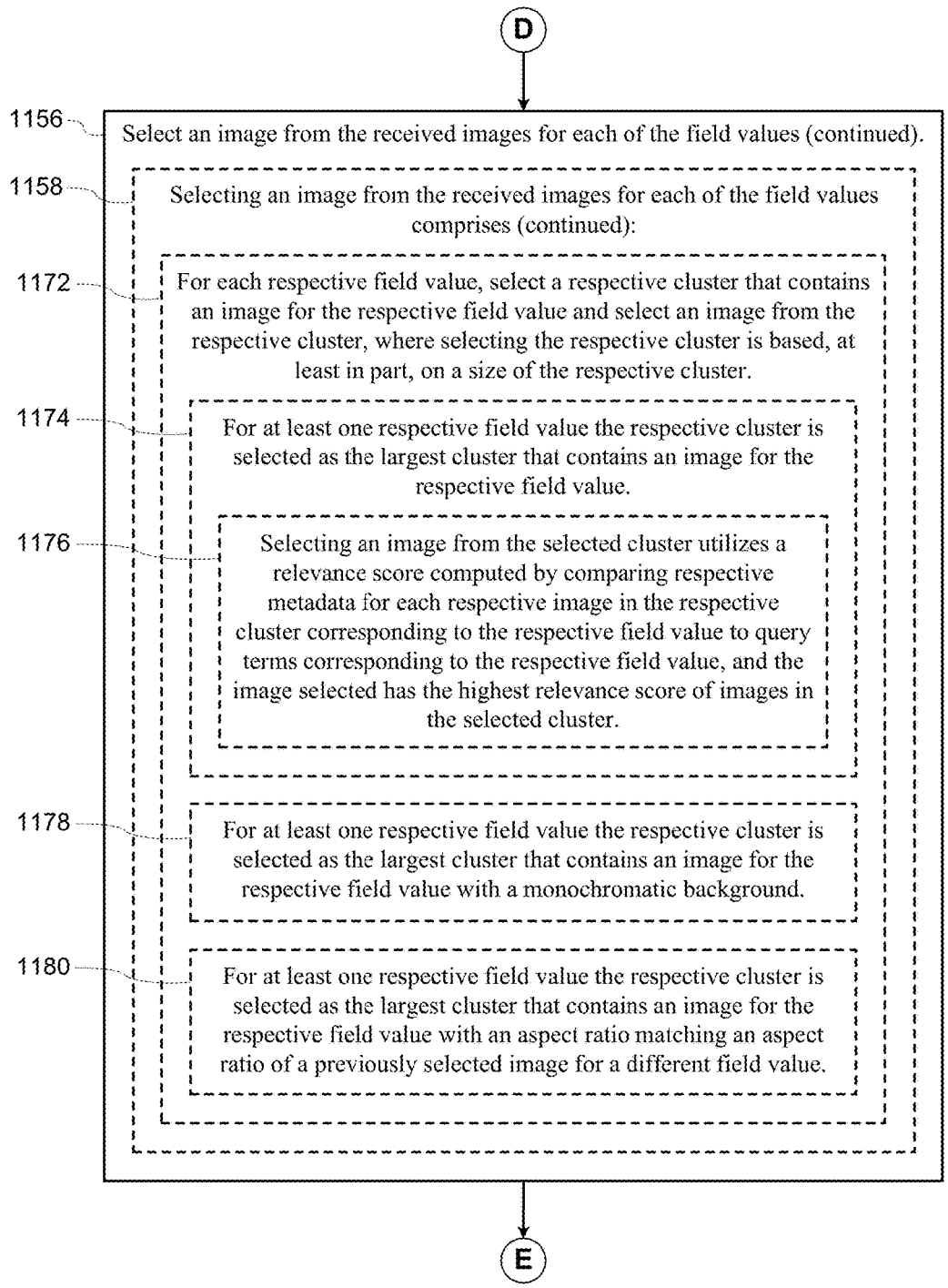
Figure 11F:
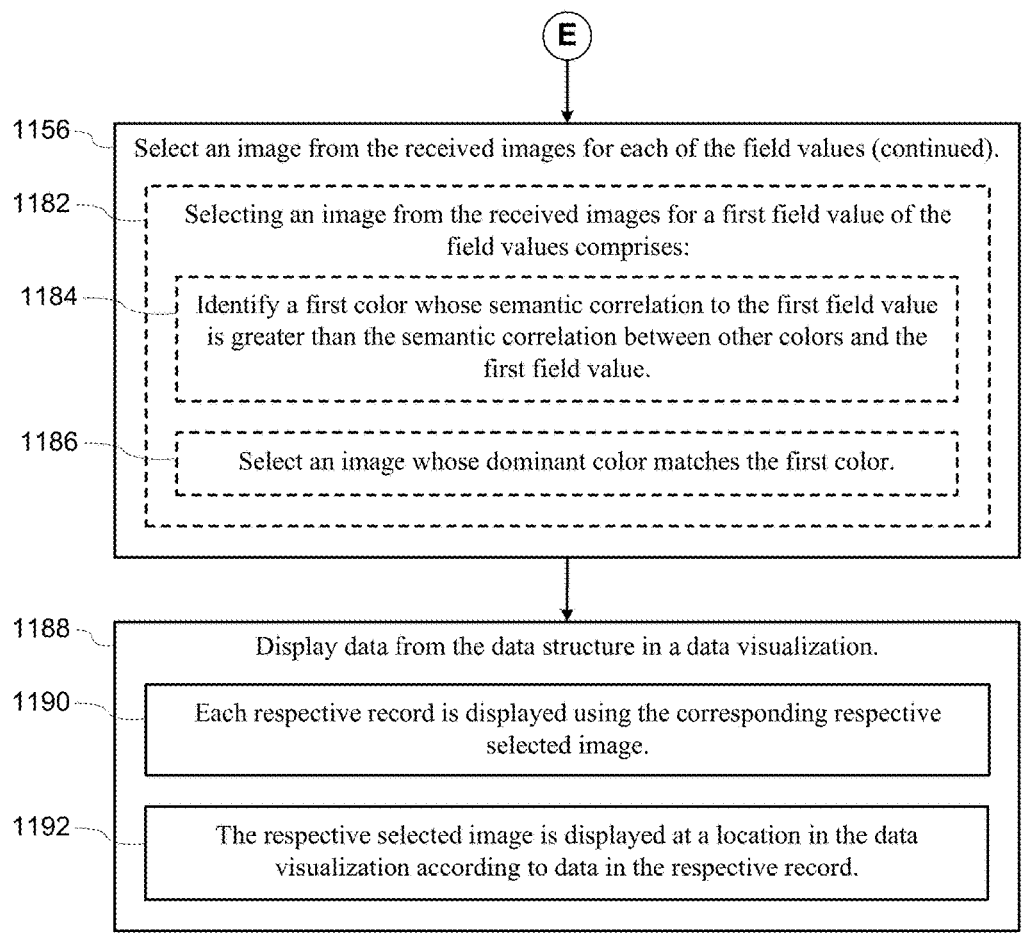

FIG. 10 is a block diagram illustrating a server 1000, in accordance with some implementations. A server 1000 may host one or more image databases 904, one or more linguistic databases 334, or may provide linguistic API functions 332. For example, server 1000 may serve as an image server 902, an image repository 904, a linguistic server 906, and/or a linguistic database 334. A server 1000 typically includes one or more processing units (CPUs) 1002, one or more network interfaces 1004, memory 1014, and one or more communication buses 1012 for interconnecting these components. In some implementations, the server 1000 includes a user interface 1006, which includes a display device 1008 and one or more input devices 1010, such as a keyboard and a mouse.

Memory 1014 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 1014 may optionally include one or more storage devices remotely located from the CPU(s) 1002. Memory 1014, or alternately the non-volatile memory device(s) within memory 1014, includes a non-transitory computer readable storage medium. In some implementations, memory 1014 or the computer readable storage medium of memory 1014 stores the following programs, modules, and data structures, or a subset thereof:

- an operating system 1016, which includes procedures for handling various basic system services and for performing hardware dependent tasks;
- a network communication module 1018, which is used for connecting the server 1000 to other computers via the one or more communication network interfaces 1004 (wired or wireless) and one or more communication networks 900, such as the Internet, other wide area networks, local area networks, metropolitan area networks, and so on;
- an image query engine 1020, which receives text-based queries from client devices 300 and responds by identifying one or more images 1024 that are responsive to the received queries. In some implementations, the image query module 1020 provides a list of the responsive images. In some implementations, the image query engine 1020 returns the images 1024 themselves or a portion of the images (e.g., the top five images based on relevance to the query). In some implementations, the image query engine 1020 includes a relevance metric for each of the images, where the metric specifies how closely each image matches the query. Typically, images are matched to queries based on the metadata associated with each image. For example, the metadata may include a name or description of the image, or the name of the file that contains the image;
- a set of image API functions 1022, which can provide information about the images (either individual images or aggregate information). For example, some implementations provide an API function that identifies the number of images in an image database 904 whose metadata includes specific terms. Some implementations provide an API function to get metadata for an individual image (e.g., to retrieve a network source 1038 for the image, a description 1032 for the image, keywords 1034 for the image, and/or the aspect ratio 1036 for the image);
- an image database 904, which stores images 1024, including a unique image ID 1026 for each image, the image content 1028 (e.g., a JPEG file), and corresponding metadata 1030. The metadata 1030 may include one or more image descriptions 1032, one or more image keywords 1034, the aspect ratio 1036 of the image (or image dimensions), the network source 1038, and so on. The network source may be specified in a text string, as illustrated above in FIGS. 7A and 7B. Some implementations include additional metadata;
- a set of linguistic API function 332, which provide information about words in a natural language. In some implementations, the linguistic API functions 332 include a relatedness calculator 1040, which computes how related two terms (or synsets) are. In some implementations, the relatedness calculator uses the formulas in FIGS. 4D and/or 4E. In some implementations, the linguistic API functions 332 include a synset list calculator 1042, which provides a list of synsets for each term. For example, if a word has three distinct word-senses, the synset list calculator 1042 would return a list of three synsets, one corresponding to each of the word-senses. In some implementations, the linguistic API functions 332 include an LCS calculator 1044, which computes the least common subsumer (LCS) of two synsets (or word-senses). This functionality was described above with respect to FIG. 4C. In some implementations, the linguistic API functions 332 include a related term calculator 1046, which identifies words that are related to a specified term. For example, the related term calculator 1046 may identify synonyms, herpernyms, and/or hyponyms. This is described above with respect to FIG. 4B. In some implementations, the related term calculator 1046 can receive one or more parameters, which may specify the extent of relatedness allowed (e.g., only terms that are synonyms or only terms that are in a synset within 1 link of the synset for the input term). In some implementations, the linguistic API functions 332 include a synset distance calculator 1048, which computes the number of links from one of the synsets to the other (e.g., the distance is 0 if the synsets are the same, a non-zero integer when one of the synsets is a descendent of the other, and is undefined or "infinite" otherwise); and
- a linguistic database 334, which includes synonym sets 1050 of word-senses for one or more natural languages. The synsets 1050 identify the terms in the synsets as well as other information, as illustrated in FIG. 4A. The linguistic database 334 also includes a set of synset relationships 1052, forming one or more synset hierarchies as illustrated in FIGS. 4B and 4C.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 1014 may store a subset of the modules and data structures identified above. Furthermore, memory 1014 may store additional modules or data structures not described above.

Although FIG. 10 shows a server 1000, FIG. 10 is intended more as functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 1000 may be stored on a client device 300. In some implementations, the functionality and/or data may be allocated between a client device 300 and one or more servers 1000.

FIGS. 11A-11F provide a flowchart of a process 1100, performed at a client computing device, for generating and displaying a data visualization with semantic icon encoding (1102) in accordance with some implementations. In this flowchart, solid rectangles identify processes or elements that are generally required, whereas dashed rectangles identify processed or elements that appear in some implementations. The client computing device 300 has (1104) one or more processors and memory.

The process identifies (1106) a set of field values for a field in a data structure, which was illustrated above with respect to FIGS. 2A, 2B, 2C, 5, and 6. The field has (1108) an associated field name, as illustrated in the same figures above. Each of the field values corresponds (1110) to a record in the data structure, as illustrated in FIGS. 2A, 2B, and 2C. The field values are (1112) words in a natural language (e.g., English in the illustrated examples). Some implementations extend this process to codes, acronyms, abbreviations, etc. that are not part of a natural language.

The process 1100 queries (1114) a database of images 904 using a plurality of queries. Each query comprises (1116) a set of base terms 514 that include (1118) a field value from the set of field values and include (1120) the field name. This is illustrated above with respect to FIG. 5. In some implementations, at least one query is expanded (1122) to include additional terms that are related to the base terms 514. In some implementations, determining whether two terms are related uses (1124) a relatedness metric f that is a function of the two terms, and for each additional term $t_a$ in the at least one respective query there is (1124) a base term $t_b$ with $f(t_a, t_b)$ greater than a predefined relatedness threshold value. One example of a relatedness metric was illustrated above in FIGS. 4D and 4E.

When at least one query is expanded (1122) to include additional terms, some of the additional terms may be (1126) hyponyms of a base term, and in some instances, an additional term is (1128) a hypernym. These are illustrated above in FIG. 4B.

In some implementations, determining whether an additional term is related to a base term uses (1130) a confidence function C based on a set of images, where each image in the set of images has metadata that includes the base term. If $I(t_b)$ is the subset of images from an image corpus I whose metadata include the base term $t_b$ and $I(t_a, t_b)$ is the set of images from I whose metadata includes both the candidate additional term $t_a$ and base term $t_b$, then some implementations define (1132) the confidence as $$C(t_a, t_b) = \frac{|I(t_a, t_b)|}{|I(t_b)|}$$

where $|I(t_a, t_b)|$ indicates the cardinality of the set $I(t_a, t_b)$ and $|I(t_b)|$ indicates the cardinality of set $I(t_b)$. Note that $I(t_a, t_b)=I(t_a) \cap I(t_b)$. In some implementations, a confidence of 0.6 or greater is required for a candidate additional term $t_a$ to be included in the set of expansion terms 516. Other implementations use alternative confidence threshold values, such as 0.5 or 0.7.

Some implementations use (1134) a support function S in addition to (or instead of) the confidence function C. The support metric S is computed (1134) by comparing the number of images whose metadata includes a candidate additional term $t_a$ and base term $t_b$ to the size of the image corpus I. If the total number of images whose metadata includes both $t_a$ and $t_b$ is too small, then the candidate additional term $t_a$ is not included in the set of expansion terms 516. In some implementations, the support function S is defined as $$S(t_a, t_b) = |I(t_a, t_b)|/|I|$$

In some implementations, when the computed value of the support function S is at least 0.04, the candidate additional term is included, but when the computed value is less than 0.04, it is excluded. Other implementations use alternative support threshold values, such as 0.035 or 0.045. In some implementations, both the confidence function C and support function S are applied, and a candidate additional term is included only when the term satisfies both tests.

In some implementations, at least one query includes a non-base term that was added (1136) based on having a semantic relation to the word "symbol" with semantic relatedness score greater than a predefined symbol threshold. In some implementations, this includes: (1) identifying (1138) a field value v that appears in at least one query; (2) identifying (1140) a set of words that co-occur adjacent to the word v in a preselected corpus of text in the natural language of the field values; (3) for each word w in the set of words, computing (1142) a semantic relatedness score between the word w and the word "symbol" (e.g., using the function described in FIGS. 4D and 4E); (4) selecting (1144) a word in the set of words having the highest semantic relatedness score; and (5) when the semantic relatedness score exceeds the predefined symbol threshold, including (1144) the selected word in the at least one query.

In some implementations, the process 1100 includes one or more words from a user-provided description or name in at least one of the queries. In some implementations, for at least one of the queries (1146) the process 1100 identifies (1148) a user-provided description of the data visualization, where the user-provided description comprises (1148) a sequence of words in the natural language. For each word in the sequence of words, the process 1100 computes (1150) the semantic relatedness between the word and a field value in the query. The semantic relatedness calculation may use the formula in FIG. 4E, an equivalent formula, or a similar formula. When the semantic relatedness score for a word is (1152) greater than a predefined description threshold, the process includes (1152) the word in the set of base terms for the query.

In response to the queries, the client device 300 receives (1154) images from the database of images. The process then selects (1156) an image from the received images for each of the field values. In some implementations, selecting an image from the received images for each of the field value uses (1158) a clustering technique. In these implementations, the retrieved images are clustered (1160) into a plurality of clusters using a proximity score for each pair of images. In some implementations, the proximity score for a pair of images is based (1162), at least in part, on the depth of matching portions of network paths that identify the sources for the pair of images. This was described above with respect to FIGS. 6, 7A, and 7B. In some implementations, the proximity score is further based (1164) on whether the aspect ratios of the two images are the same.

In some implementations, prior to clustering, the process filters out (1166) one or more images from the received images. In some implementations, the filtering computes (1168) a relevance score for each respective image by comparing respective metadata for the respective image to query terms for the respective query that retrieved the respective image, and filters out (1168) one or more images with the lowest relevance scores. In some implementations, the process 1100 filters out (1170) retrieved images that do not have monochromatic backgrounds.

In some implementations, forming the clusters uses a group average agglomerative clusterer (GAAC) algorithm. In some implementations, each of the images is initially considered a cluster with one image. At the first step, the two images that are the closest are merged into a single cluster. The process continues, and at each step, the two closest clusters are merged into a single cluster. The process can stop in various ways. In some implementations, the process stops when a target number of clusters has been reached (e.g., 6 clusters). In some implementations, the process stops when none of the remaining clusters are sufficiently close together. Some implementations combine these two termination conditions. Some implementations use other clustering algorithms, such as the K-means clustering algorithm.

Once the set of images has been partitioned into a set of clusters, images for each field value are selected. Implementations use various criteria for selection, including: the size of the clusters (selecting from larger clusters generally results in more consistent images); whether the images have monochromatic backgrounds (these are generally better for data visualizations); aspect ratio (preferring to select all of the images with the same aspect ratio); and relevance to the corresponding field values.

In some implementations, for each respective field value, a respective cluster is selected (1172) that contains an image for the respective field value and an image is selected (1172) from the respective cluster, where selecting the respective cluster is based (1172), at least in part, on a size of the respective cluster. In some implementations, for at least one respective field value the respective cluster is selected (1174) as the largest cluster that contains an image for the respective field value. In some implementations, selecting an image from the selected cluster uses (1176) a relevance score computed by comparing respective metadata for each respective image in the respective cluster corresponding to the respective field value to query terms corresponding to the respective field value, and the image selected has (1176) the highest relevance score of images in the selected cluster.

In some implementations, for at least one respective field value the respective cluster is selected (1178) as the largest cluster that contains an image for the respective field value with a monochromatic background. In some implementations, for at least one respective field value the respective cluster is selected (1180) as the largest cluster that contains an image for the respective field value with an aspect ratio matching an aspect ratio of a previously selected image for a different field value.

In some implementations, selecting an image for a field value may also use color. In some implementations, selecting an image from the received images for a first field value of the field values comprises (1182): (1) identifying (1184) a first color whose semantic correlation to the first field value is greater than the semantic correlation between other colors and the first field value; and (2) selecting (1186) an image whose dominant color matches the first color. An exemplary process for identifying and using colors is provided below with respect to FIG. 12.

After the images are selected, the process 1100 displays (1188) data from the data structure in a data visualization. In the data visualization, each respective record is displayed (1190) using the corresponding selected image, as illustrated in FIG. 1B above. Each selected image is displayed (1192) at a location in the data visualization according to data in the record. For example, in FIG. 1B, each animal icon is displayed at a location in the graph based on the animal's average brain mass and average body mass.

The description above has described methods for identifying appropriate icons to use in a data visualization, as illustrated in FIG. 1B. Many of the concepts disclosed herein can be extended in various ways. In some implementations, the process is extended to identify an appropriate color for items displayed in a data visualization. For example, instead of identifying team logos as shown in FIG. 5, the process could identify one or more team colors. In other implementations, color calculations are combined with the icon selection so that icons with preferred colors are selected.

Figure 12:
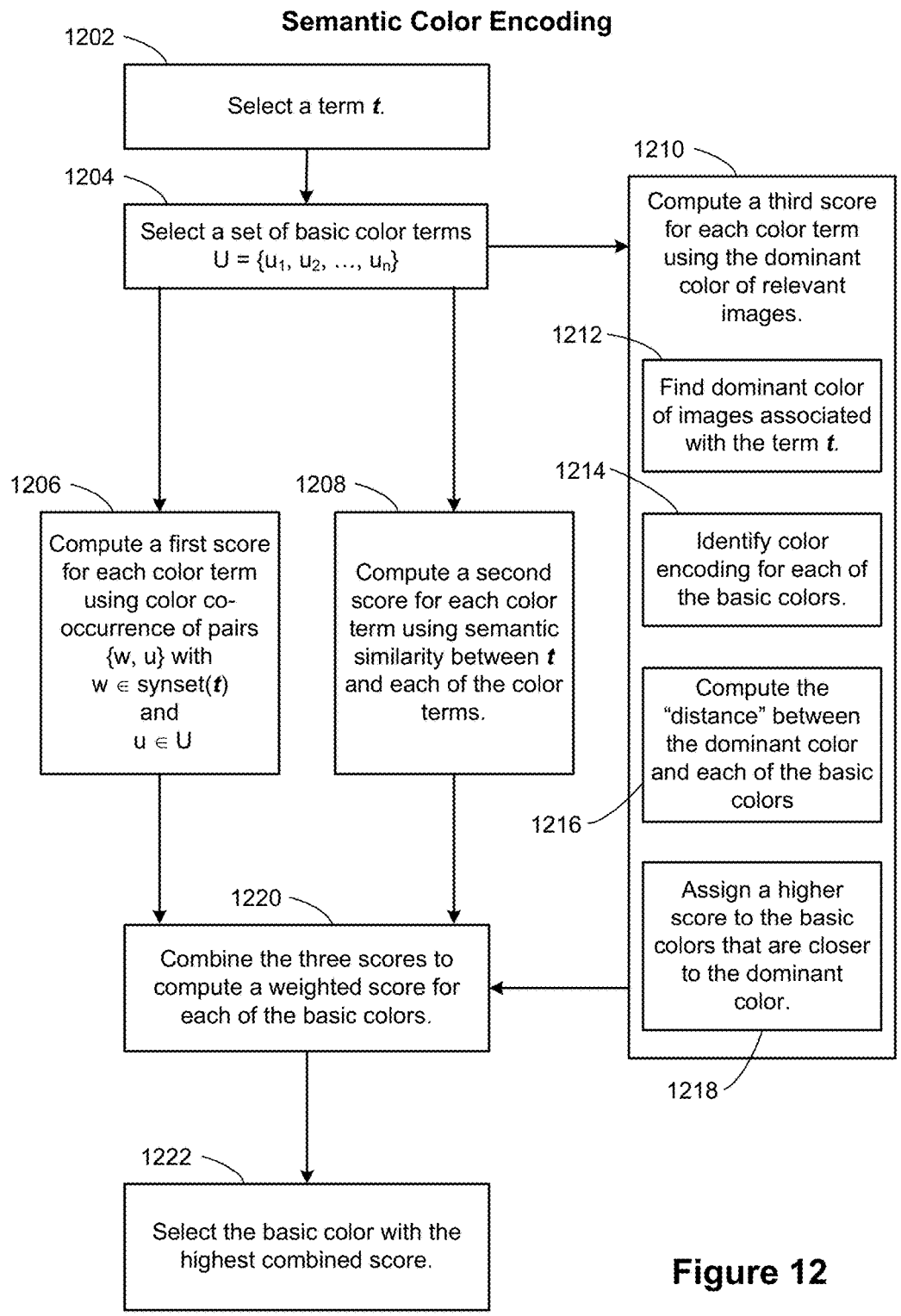
FIG. 12 is a flowchart for semantic color encoding in accordance with some implementations.

Semantic color encoding is illustrated with respect to FIG. 12. In some implementations, a term t is selected (1202), and a corresponding optimal color is desired. In some implementations, the process selects (1204) a set of basic color terms $U=\{u_1, u_2, \ldots, u_n\}$. In general this set cannot be too large. In some implementations, the set is the set of basic color words {white, black, red, green, yellow, blue, brown, purple, pink, orange, and gray} that are monomorphemic (i.e. cannot be divisible into smaller words, such as blue-green) and monolexemic (i.e. having a single fundamental unit in the linguistic structure, such as bluish green). Once the set of colors are selected (or, more commonly, preselected), three independent techniques may be applied to identify an optimal color corresponding to the selected term t. Some implementations use all three techniques, whereas other implementations use only one or two of the disclosed techniques.

In a first technique, a first score is computed (1206) for each color term using color co-occurrence pairs {w, u} with w ∈ synset(t) and u ∈ U. The co-occurrence counting is based on a specified corpus of text in the relevant natural language. "Co-occurrence" refers to having the pair of words adjacent to each other in the corpus. In some implementations, words with any intervening punctuation are not considered co-occurring. Based on the total co-occurrence count $n_i$ for each color a score is computed. In some implementations, the scores are normalized to range from 0 to 1, with 0 indicating no co-occurrence. In some implementations, the color with the highest co-occurrence count is assigned a score of 1.0, and the other colors have proportional scores based on their co-occurrence count. In some implementations, the values are normalized by dividing each count $n_i$ by T, where $$T = \sqrt{\sum_i n_i^2}$$

In a second technique, a second score is computed (1208) for each color term using semantic similarity between the term t and each of the color terms. Using a function such as the one described above with respect to FIGS. 4C, 4D, and 4E, the second score can be computed, and is normalized to range from 0 (not similar) to 1 (identical).

In a third technique, a third score is computed (1210) for each color term using the dominant color of relevant images from an image corpus. This calculation comprises several steps. First, the technique finds (1212) a dominant color of images associated with the term t. In some implementations, the top N most relevant images corresponding to the keyword t are identified. Then each of these images is scaled down to a single pixel with antialiasing enabled, resulting in a single RGB tuple representing the dominant color of the image. In some implementations, the images are restricted to cartoonish images rather than photographs (e.g., by recognizing monochromatic backgrounds, as described above, or specifying 'clipart' as a query parameter) in order to minimize the effects of color quantization and averaging.

The third technique also identifies (1214) color encoding for each of the basic colors. In some implementations, the RGB values for each of the basic colors is preselected. In some implementations, the RGB values for the basic colors are assigned by crowdsourcing (e.g., what RGB tuple best represents the average of what people think of as "purple").

The third technique then computes (1216) the "distance" between the dominant color and each of the basic colors. Because each of the colors has been specified as an RGB tuple, distance between tuples can be computed in the normal way for points in a three dimensional space. In some implementations, the distance is the simple Euclidean distance, which can be computed using the distance formula $$d=\sqrt{(r_1-r_2)^2+(g_1+g_2)^2+(b_1+b_2)^2}$$

where $(r_1, g_1, b_1)$ and $(r_2, g_2, b_2)$ are the two RGB tuples to compare. One of ordinary skill in the art recognizes that other distance measures can be used as well, such as the $L^1$ norm that adds the absolute values of the differences for each of the color components.

Using the distances, scores are assigned in such a way that colors closer to the dominant color have (1218) higher score values. For example, some implementations compute the third score as exp (−k·distance), where k is a positive constant and exp( ) is the exponential function. (In this way, the score is 1 when the distance is 0, and as the distance increases, the score approaches 0.)

The process then combines (1220) the three scores to compute a weighted average score for each of the basic colors. In implementations that use only one or two of the techniques, only the scores for those techniques are included in the weighted average. In some implementations, empirical data can demonstrate that the three techniques have varying degrees of accuracy, and thus the three scores are not necessarily weighted equally. Finally, the process selects (1222) the basic color with the highest combined score.

The selected color may be used by itself in a data visualization (e.g., coloring dots in a data visualization based on the color selected for each field value), or it may be combined with an icon (e.g., selecting an icon with color or dominant color matching the selected color). In addition, the technique outlined above may be expanded to select two or more colors. For example, the top two colors may be identified.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. For example, the synset relatedness formula 472 and the word relatedness formula 474 are merely exemplary. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of semantic icon encoding, comprising:
    at a computing device having one or more processors and memory, responding to user selection of a field in a data structure to create a data visualization by:
        identifying a set of field values for the field in the data structure, wherein the field has an associated field name and each field value corresponds to a record in the data structure, and wherein the field values are words in a natural language;
        for each field value in the set of field values:
            building a respective query that comprises a respective set of base terms including:
                the respective field value; and
                the field name;
            executing the respective query to retrieve a respective set of images from a database of images; and
            selecting a respective image from the retrieved respective set of images;
        wherein for at least one respective query, building the respective query further comprises:
            determining that an addition term $t_a$ is related to a base term $t_b$ according to a confidence function C based on an image corpus I, wherein $I(t_a, t_b)$ is a subset of images, from the image corpus I, whose metadata includes the terms $t_a$ and $t_b$, $I(t_b)$ is the subset of images, from the image corpus I, whose metadata includes the term $t_b$, the confidence function C is computed as $$C(t_a, t_b) = \frac{|I(t_a, t_b)|}{|I(t_b)|}$$

and $C(t_a, t_b)$ is greater than a predefined confidence threshold value; and
            expanding the respective query to include the additional term $t_a$; and
        displaying data from the data structure in a data visualization, wherein each respective record in the data structure is displayed using the corresponding respective selected image, and wherein the respective selected image is displayed, instead of the respective field value, at a location in the data visualization according to data in the respective record.

2. The method of claim 1, wherein determining whether two terms are related uses a relatedness metric f that is a function of the two terms, and for each additional term $t_a$ in the at least one respective query there is a base term $t_b$ with $f(t_a, t_b)$ greater than a predefined relatedness threshold value.

3. The method of claim 1, wherein the additional terms include one or more hyponyms.

4. The method of claim 1, wherein the additional terms include one or more hypernyms.

5. The method of claim 1, wherein determining that the additional term $t_a$ is related to the base term $t_b$ further comprises identifying a number N of images in the image corpus and determining that $|I(t_a, t_b)|/N$ is greater than a predefined support threshold value.

6. The method of claim 1, wherein at least one respective query includes a non-base term that was added based on having a semantic relation to the word "symbol" with semantic relatedness score greater than a predefined symbol threshold.

7. The method of claim 6, wherein the at least one respective query includes a field value v, the method further comprising:
    identifying a set of words that co-occur adjacent to the word v in a preselected corpus of text in the natural language of the field values;

for each word w in the set of words, computing a semantic relatedness score between the word w and the word "symbol"; and selecting a word in the set of words having a highest semantic relatedness score, and when the semantic relatedness score exceeds the predefined symbol threshold, including the selected word in the at least one respective query.

8. The method of claim 1, further comprising for at least one respective query:

identifying a user provided description of the data visualization, wherein the user-provided description comprises a sequence of words;

for each word in the sequence of words, computing a semantic relatedness score between the word and a field value in the respective query; and when the semantic relatedness score for a word is greater than a predefined description threshold, including the word in the base terms for the respective query.

9. The method of claim 1, wherein selecting a respective image from the retrieved respective set of images comprises;

clustering the retrieved respective set of images into a plurality of clusters using a proximity score for each pair of images, wherein the proximity score for a pair of images is based, at least in part, on depth of matching portions of network paths that identify sources for the pair of images; and for each field value in the set of field values, selecting a respective cluster that contains an image for the respective field value and selecting an image from the respective cluster, wherein selecting the respective cluster is based, at least in part, on a size of the respective cluster.

10. The method of claim 9, further comprising filtering out one or more images from the retrieved respective set of images prior to clustering.

11. The method of claim 10, wherein the filtering computes a relevance score for each respective image by comparing respective metadata for the respective image to query terms for the respective query that retrieved the respective image, and wherein one or more images with lowest relevance scores are filtered out.

12. The method of claim 10, wherein the filtering removes retrieved images that do not have monochromatic backgrounds.

13. The method of claim 9, wherein for at least one respective field value the respective cluster is selected as the largest cluster that contains an image for the respective field value.

14. The method of claim 13, wherein selecting an image from the selected cluster utilizes a relevance score computed by comparing respective metadata for each respective image in the respective cluster corresponding to the respective field value to query terms corresponding to the respective field value, and wherein the image selected has the highest relevance score of images in the selected cluster.

15. The method of claim 9, wherein for at least one respective field value the respective cluster is selected as the largest cluster that contains an image for the respective field value with a monochromatic background.

16. The method of claim 9, wherein for at least one respective field value the respective cluster is selected as the largest cluster that contains an image for the respective field value with an aspect ratio matching an aspect ratio of a previously selected image for a different field value.

17. The method of claim 9, wherein the proximity score for a pair of images is further based, at least in part, on whether aspect ratios for the pair of images are the same.

18. The method of claim 1, wherein selecting a respective image from the retrieved respective set of images for a first field value in the set of field values comprises:

identifying a first color whose semantic correlation to the first field value is greater than the semantic correlation between other colors and the first field value; and selecting an image whose dominant color matches the first color.

19. A client device, comprising:

one or more processors;

memory; and one or more programs stored in the memory for execution by the one or more processors, the one or more programs comprising instructions for responding to user selection of a field in a data structure to create a data visualization by:

identifying a set of field values for the field in the data structure, wherein the field has an associated field name and each field value corresponds to a record in the data structure, and wherein the field values are words in a natural language;

for each field value in the set of field values:

building a respective query that comprises a respective set of base terms including:

the respective field value from the set of field values; and the field name;

executing the respective query to retrieve a respective set of images from a database of images; and selecting a respective image from the retrieved respective set of images;

wherein for at least one respective query, building the respective query further comprises:

determining that an addition term $t_a$ is related to a base term $t_b$ according to a confidence function C based on an image corpus I, wherein $I(t_a, t_b)$ is a subset of images, from the image corpus I, whose metadata includes the terms $t_a$ and $t_b$, $I(t_b)$ is the subset of images, from the image corpus I, whose metadata includes the term $t_b$, the confidence function C is computed as $$C(t_a, t_b) = \frac{|I(t_a, t_b)|}{|I(t_b)|}$$

and $C(t_a, t_b)$ is greater than a predefined confidence threshold value; and expanding the respective query to include the additional term $t_a$; and displaying data from the data structure in a data visualization, wherein each respective record in the data structure is displayed using the corresponding respective selected image, and wherein the respective selected image is displayed, instead of the respective field value, at a location in the data visualization according to data in the respective record.

20. A computer readable storage medium storing one or more programs configured for execution by a client device having one or more processors and memory storing one or more programs for execution by the one or more processors, the one or more programs comprising instructions for responding to user selection of a field in a data structure to create a data visualization by:

identifying a set of field values for the field in the data structure, wherein the field has an associated field name and each field value corresponds to a record in the data structure, and wherein the field values are words in a natural language;

for each field value in the set of field values:
- building a respective query that comprises a respective set of base terms including:
  - the respective field value from the set of field values; and
  - the field name;
- executing the respective query to retrieve a respective set of images from a database of images; and
- selecting a respective image from the retrieved respective set of images;

wherein for at least one respective query, building the respective query further comprises:
- determining that an addition term $t_a$ is related to a base term $t_b$ according to a confidence function C based on an image corpus I, wherein $I(t_a, t_b)$ is a subset of images, from the image corpus I, whose metadata includes the terms $t_a$ and $t_b$, $I(t_b)$ is the subset of images, from the image corpus I, whose metadata includes the term $t_b$, the confidence function C is computed as $$C(t_a, t_b) = \frac{|I(t_a, t_b)|}{|I(t_b)|}$$

and $C(t_a, t_b)$ is greater than a predefined confidence threshold value; and
- expanding the respective query to include the additional term $t_a$; and
- displaying data from the data structure in a data visualization, wherein each respective record in the data structure is displayed using the corresponding respective selected image, and wherein the respective selected image is displayed, instead of the respective field value, at a location in the data visualization according to data in the respective record.

* * * * *